(12) United States Patent
Morrison et al.

(10) Patent No.: US 10,079,534 B2
(45) Date of Patent: Sep. 18, 2018

(54) SUPERCONDUCTING ELECTRICAL MACHINE WITH ROTOR AND STATOR HAVING SEPARATE CRYOSTATS

(71) Applicant: Kato Engineering Inc., North Mankato, MN (US)

(72) Inventors: Darrell Morrison, Eagle Lake, MN (US); Ted Daly, Eagle Lake, MN (US)

(73) Assignee: KATO ENGINEERING INC., North Mankato, MN (US)

( * ) Notice: Subject to any disclaimer, the term of this patent is extended or adjusted under 35 U.S.C. 154(b) by 572 days.

(21) Appl. No.: 14/662,054

(22) Filed: Mar. 18, 2015

(65) Prior Publication Data
US 2016/0276906 A1    Sep. 22, 2016

(51) Int. Cl.
*H02K 55/04*    (2006.01)
*H02K 9/19*    (2006.01)

(52) U.S. Cl.
CPC ............. *H02K 55/04* (2013.01); *H02K 9/19* (2013.01); *Y02E 40/625* (2013.01)

(58) Field of Classification Search
CPC .............................................. H02K 9/00–9/28
USPC ....................................................... 310/52–65
See application file for complete search history.

(56) References Cited

U.S. PATENT DOCUMENTS

| 4,216,398 A * | 8/1980 | Kullmann | H02K 9/19 |
| | | | 310/53 |
| 4,808,864 A * | 2/1989 | Brunet | H02K 55/04 |
| | | | 310/10 |
| 4,816,708 A * | 3/1989 | Laumond | H02K 55/04 |
| | | | 310/52 |
| 7,466,045 B2 | 12/2008 | Andres | |
| 7,638,908 B2 | 12/2009 | Winn | |
| 7,791,229 B2 | 9/2010 | Goodzeit | |
| 8,084,909 B2 | 12/2011 | Goodzeit et al. | |
| 2009/0251014 A1 | 10/2009 | Goodzeit | |
| 2010/0148593 A1* | 6/2010 | Ohashi | H02K 55/02 |
| | | | 310/10 |
| 2010/0244596 A1* | 9/2010 | Husband | H02K 55/02 |
| | | | 310/64 |

* cited by examiner

*Primary Examiner* — Thomas Truong
(74) *Attorney, Agent, or Firm* — Foley & Lardner LLP

(57) ABSTRACT

A superconducting electrical machine includes a rotor and a stator. The rotor includes rotor windings configured to superconduct when cooled in a rotor cryostat to a temperature no greater than a rotor superconducting temperature. The stator includes a stator windings configured to superconduct when cooled in a stator cryostat to a temperature no greater than a stator superconducting temperature. The rotor cryostat surrounds the rotor and is configured to allow transport of a first coolant through a plurality of conduits adjacent to the rotor windings in order to draw heat from the rotor windings and reduce the temperature of the rotor windings to a temperature no greater than the rotor superconducting temperature. The stator cryostat surrounds the stator and is configured to allow transport of a second coolant through a plurality of conduits adjacent to the stator windings in order to draw heat from the stator windings and reduce the temperature of the stator windings to a temperature no greater than the stator superconducting temperature.

12 Claims, 20 Drawing Sheets

SUPERCONDUCTING ELECTRICAL MACHINE WITH ROTOR AND STATOR HAVING SEPARATE CRYOSTATS

FEDERAL FUNDING STATEMENT

The present disclosure was made with government support under Contract No. DE-EE0005140 awarded by the U.S. Department of Energy. The U.S. Government has certain rights in the present disclosure.

BACKGROUND

The present invention relates generally to the field of machines for energy conversion, such as motors and generators. Motors convert electricity into mechanical energy. Generators generate electricity by converting mechanical energy into electrical energy. A prime mover, such as an engine driving a rotating shaft, provides the mechanical energy. A rotor having permanent magnets or electromagnets rotates with the rotating shaft, generating a magnetic field that causes electricity to be generated in a stationary stator.

Superconducting electrical machines, such as a superconducting generator, use the principle of superconductivity to significantly reduce the electrical resistance in the conductors of the generator. Superconductivity requires maintaining the conductors at very low temperatures. The extreme cold temperatures require operation in a vacuum to prevent icing and minimize heat transfer by convection. Often, complex vacuum pumping and sealing systems are required to maintain the conductors at the very low temperatures necessary for superconductivity. The containment apparatus used to reach and maintain superconducting temperatures is called a cryostat.

SUMMARY

One embodiment of the invention relates to a superconducting electrical machine. The superconducting electrical machine includes a rotor including rotor windings configured to superconduct when cooled in a rotor cryostat to a temperature no greater than a rotor superconducting temperature. The superconducting electrical machine also includes a stator including stator windings configured to superconduct when cooled in a stator cryostat to a temperature no greater than a stator superconducting temperature. The rotor cryostat surrounds the rotor. The rotor cryostat is configured to allow transport of a first coolant through a plurality of conduits adjacent to the rotor windings in order to draw heat from the rotor windings and reduce the temperature of the rotor windings to a temperature no greater than the rotor superconducting temperature. The stator cryostat surrounds the stator. The stator cryostat is configured to allow transport of a second coolant through a plurality of conduits adjacent to the stator windings in order to draw heat from the stator windings and reduce the temperature of the stator windings to a temperature no greater than the stator superconducting temperature.

Another embodiment of the invention relates to a superconducting electrical system. The system includes a rotor including rotor windings configured to superconduct when cooled in a rotor cryostat to a temperature no greater than a rotor superconducting temperature. The system includes a stator including stator windings configured to superconduct when cooled in a stator cryostat to a temperature no greater than a stator superconducting temperature. The rotor cryostat encloses the rotor, and is configured to allow transport of a first coolant through a plurality of conduits adjacent to the rotor windings in order to draw heat from the rotor windings and maintain the temperature of the rotor windings at a temperature no greater than the rotor superconducting temperature. The stator cryostat encloses the stator, and is configured to allow transport of a second coolant through a plurality of conduits adjacent to the stator windings in order to draw heat from the stator windings and maintain the temperature of the stator windings at a temperature no greater than the stator superconducting temperature. The system includes a cryocooler. The cryocooler is coupled to the rotor cryostat and is configured to deliver a first flow of the first coolant to the rotor cryostat. The cryocooler is coupled to the stator cryostat and is configured to deliver a second flow of the second coolant to the stator cryostat.

Another embodiment of the invention relates to a system for maintaining a superconductor at a superconducting temperature. The system includes a first superconductor and a second superconductor. The system includes a first containment device enclosing the first superconductor. The first containment device is configured to allow transport of a first coolant through a plurality of conduits contained by the first containment device in order to maintain a first temperature within the first containment device at a value no greater than a first superconducting temperature. The system also includes a second containment device configured to allow transport of a second coolant through a plurality of conduits contained by the second containment device in order to maintain a second temperature within the second containment device at a value no greater than a second superconducting temperature.

Another embodiment relates to a superconducting electrical machine including a rotor and a stator. The rotor includes rotor windings configured to superconduct when cooled in a rotor cryostat to a temperature no greater than a rotor superconducting temperature. The stator includes a stator windings configured to superconduct when cooled in a stator cryostat to a temperature no greater than a stator superconducting temperature. The rotor cryostat surrounds a rotor active section and is configured to allow transport of a first coolant through a plurality of conduits adjacent to the rotor windings in order to draw heat from the rotor windings and reduce the temperature of the rotor windings to a temperature no greater than the rotor superconducting temperature. The stator cryostat surrounds a stator active section and is configured to allow transport of a second coolant through a plurality of conduits adjacent to the stator windings in order to draw heat from the stator windings and reduce the temperature of the stator windings to a temperature no greater than the stator superconducting temperature.

Alternative embodiments relate to other features and combinations of features as may be generally recited in the claims.

BRIEF DESCRIPTION OF THE DRAWINGS

The invention will become more fully understood from the following detailed description, taken in conjunction with the accompanying figures, in which like reference numerals refer to like elements.

DETAILED DESCRIPTION

Before turning to the figures, which illustrate the exemplary embodiments in detail, it should be understood that the present application is not limited to the details or methodology set forth in the description or illustrated in the figures.

It should also be understood that the terminology is for the purpose of description only and should not be regarded as limiting.

Referring generally to the figures, superconducting electrical machines may include a stator supported in a stator frame and a rotor configured to rotate in a cavity defined by the stator. A rotor cryostat may surround the rotor, including a rotor active section, in order to provide a closed vacuum environment for the rotor and to minimize heat transfer to the rotor from an environment remote from the rotor. The rotor may include rotor windings configured to superconduct when cooled in the rotor cryostat to a temperature no greater than a rotor superconducting temperature. The rotor cryostat may be configured to allow transport of a first coolant through a plurality of conduits adjacent to the rotor windings in order to draw heat from the rotor windings and maintain the temperature of the rotor windings at a temperature no greater than the rotor superconducting temperature. A stator cryostat may surround the stator and stator active section, in order to provide a closed vacuum environment for the stator and to minimize heat transfer to the stator from an environment remote from the stator. Active sections such as the rotor active section and stator active section include regions in which superconducting processes may occur, in which superconducting temperatures may be achieved, and/or which are involved in the electromagnetic behavior of the superconducting electrical machine. The stator may include stator windings configured to superconduct when cooled in the stator cryostat to a temperature no greater a stator superconducting temperature. The stator cryostat may be configured to allow transport of a second coolant through a plurality conduits adjacent to the stator windings in order to draw heat from the stator windings and maintain the temperature of the stator windings at a temperature no greater than the stator superconducting temperature.

Figure 1:
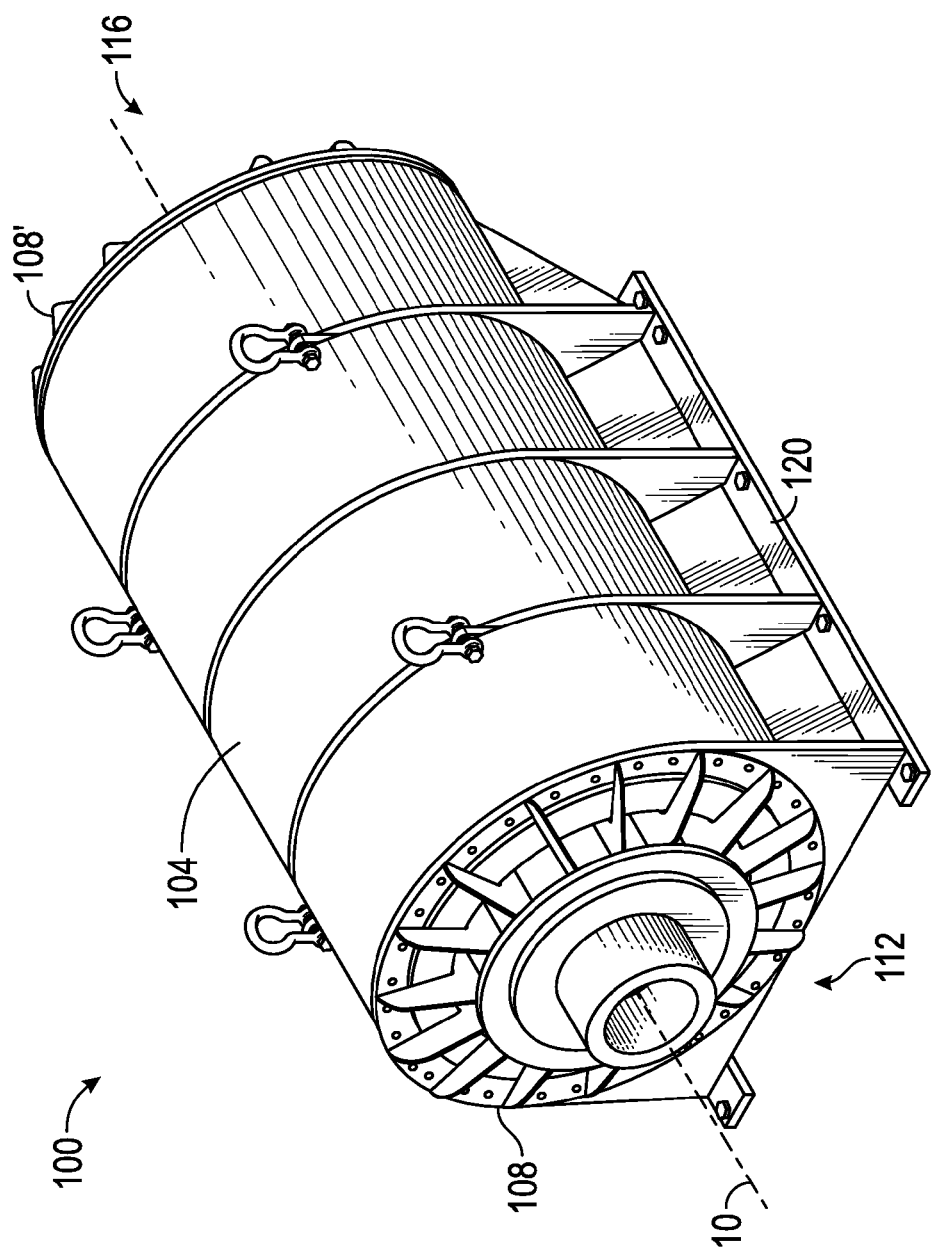
FIG. 1 is a perspective view of a superconducting electrical machine, in accordance with one embodiment.

Referring to FIG. 1, in some embodiments, a superconducting electrical machine 100 includes a stator frame 104. Stator frame 104 may be a housing that supports a stator (e.g., stator 160 shown in FIG. 7). In some embodiments, the stator frame 104 includes a shape that is substantially a cylindrical shell. The superconducting electrical machine 100 may also include a base 120 attached to the stator frame 104 to support the weight of the superconducting electrical machine 100.

A superconducting electrical machine 100 may include a pair of bracket assemblies 108, 108' disposed at a drive end 112 and a non-drive end 116 of the superconducting electrical machine 100. The pair of bracket assemblies 108, 108' may include a pair of bearings to support a rotor and accommodate rotation of the rotor about a longitudinal axis 10 (see, e.g., bearings 180, 180', rotor 150 shown in FIG. 11). A longitudinal axis 10 may pass through the superconducting electrical machine 100 and perpendicular to a pair of planes substantially defined by the pair of bracket assembles 108, 108'.

A drive end 112 is an end region of a superconducting electrical machine 100 proximate to a prime mover, such as a wind turbine, and at which a shaft may be received from the prime mover. A non-drive end 116 is an end region of the superconducting electrical machine 100 located on an opposite end of the superconducting electrical machine 100 from the drive end 112.

Figure 2:
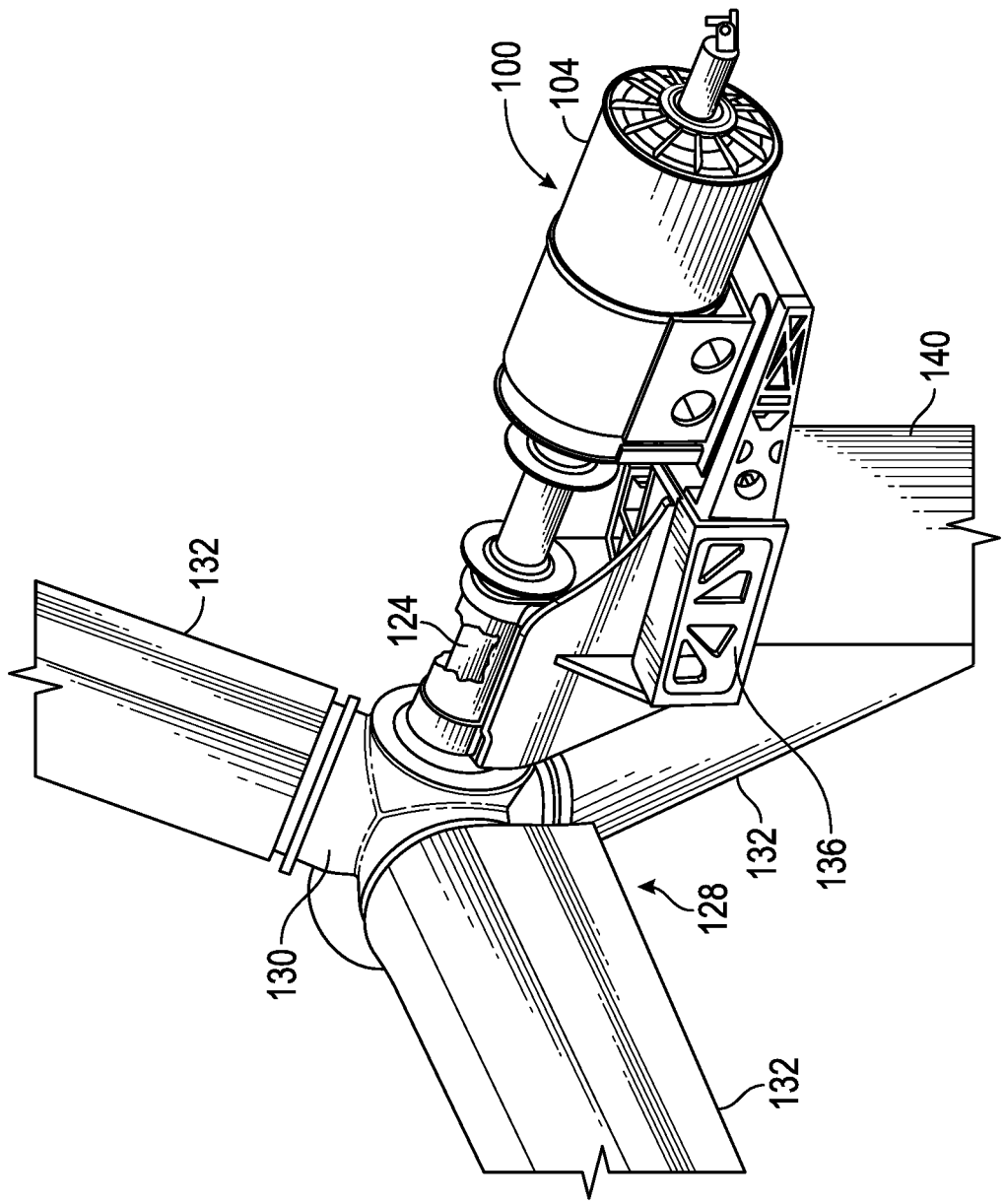
FIG. 2 is a perspective view of a superconducting electrical machine driven by a wind turbine, in accordance with one embodiment.

Referring to FIG. 2, in some embodiments, a superconducting electrical machine 100 is driven by a shaft 124 coupled to a wind turbine 128. The wind turbine 128 may include a mainframe 136 supported by a tower 140. In some embodiments, including but not limited to offshore wind applications, the tower 140 may be configured to stand on an ocean floor and withstand tidal action, storms, and other physical impacts of both continuous and transitory natures. In some embodiments, including but not limited to land-based wind applications, the tower 140 may be configured to stand on any kind of terrain and withstand storms and other physical impacts of both continuous and transitory natures.

In various embodiments, a superconducting electrical machine 100 is driven by various prime movers or drives various loads. For example, the superconducting electrical machine 100 may be driven by an engine, such as an engine using oil, gasoline, diesel, or other fossil fuels as a fuel source. The superconducting electrical machine 100 may be driven by a gas turbine. The superconducting electrical machine 100 may be driven by a nuclear reactor steam turbine, such as in a naval submarine. The superconducting electrical machine 100 may be used in various naval contexts, such as with oil, gasoline, or diesel engines; with gas turbines; as a propulsion motor benefiting from the high specific torque of the superconducting electrical machine 100; etc.

In some embodiments, a wind turbine 128 includes a plurality of blades 132 configured to rotate a shaft 124 when acted upon by a force, such as a force generated by wind. The plurality of blades 132 may extend radially from a central hub 130 which is coupled to the shaft 124, and the plurality of blades 132 may rotate the central hub 130 and in turn rotate the shaft 124 when acted upon by a force. The plurality of blades 132 may include three blades 132 arranged in a circular configuration. In some embodiments, the plurality of blades 132 are arranged in a circular configuration and spaced equidistantly from each other, the plurality of blades being spaced by approximately 60 degrees from each other. In some embodiments, a wind turbine 128 drives a first shaft 124, which is coupled to a second shaft for driving a superconducting electrical machine 100. An intermediate shaft may also be coupled between the first shaft and second shaft.

Figure 3:
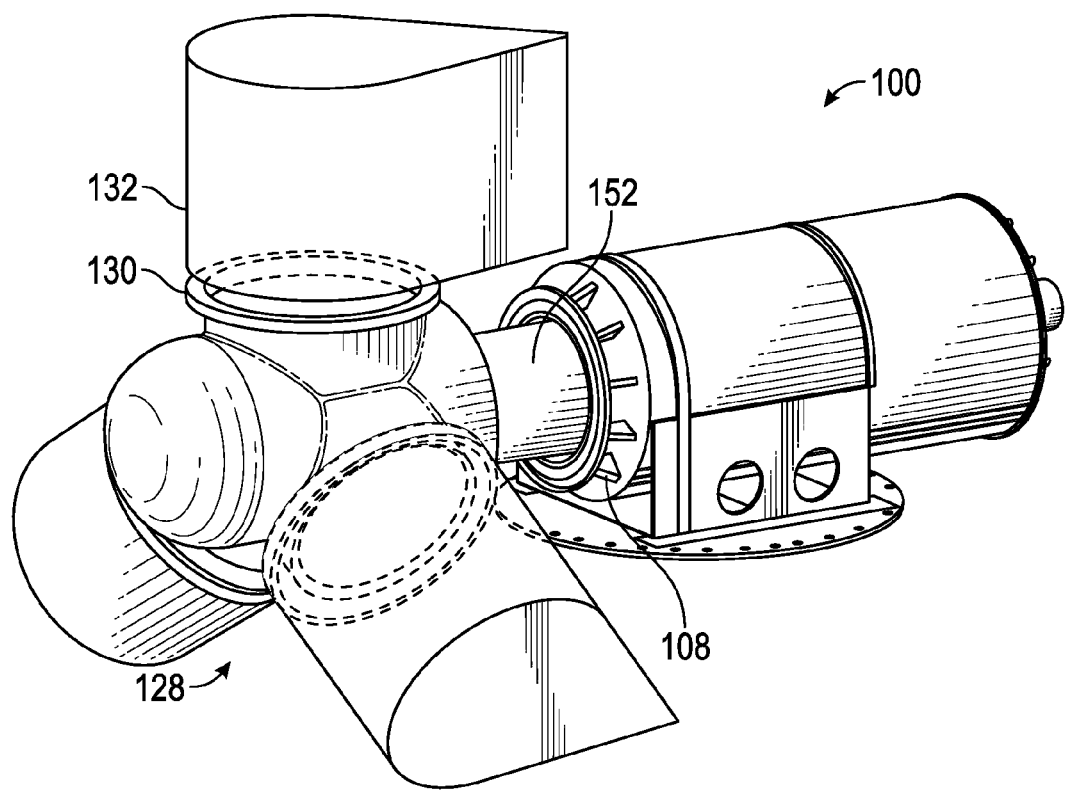
FIG. 3 is a perspective view of a superconducting electrical machine driven by a wind turbine, in accordance with one embodiment.

Referring to FIG. 3, in some embodiments, a wind turbine 128 includes a plurality of blades 132 extending from a central hub 130. The central hub 130 may be coupled to a shaft 152. The shaft 152 may pass directly through the bracket 108 at the drive end 112 of the superconducting electrical machine, into a rotor (e.g., rotor 150 shown in FIG. 7). The shaft 152 may be coupled to the rotor 150 to directly rotate the rotor 150 and drive the superconducting electrical machine 100. In some embodiments, the shaft 152 rotates the rotor 150 at a constant rate. In some embodiments, the superconducting electrical machine 100 is configured for variable speed operation. A voltage regulator may be used to account for variations in voltage due to variations in the rotation rate of the shaft 152. In some embodiments, the shaft 152 is configured to rotate the rotor 150 at a rate no greater than 100 revolutions per minute. In some embodiments, the shaft 152 is configured to rotate the rotor at approximately 10 revolutions per minute.

Figure 4:
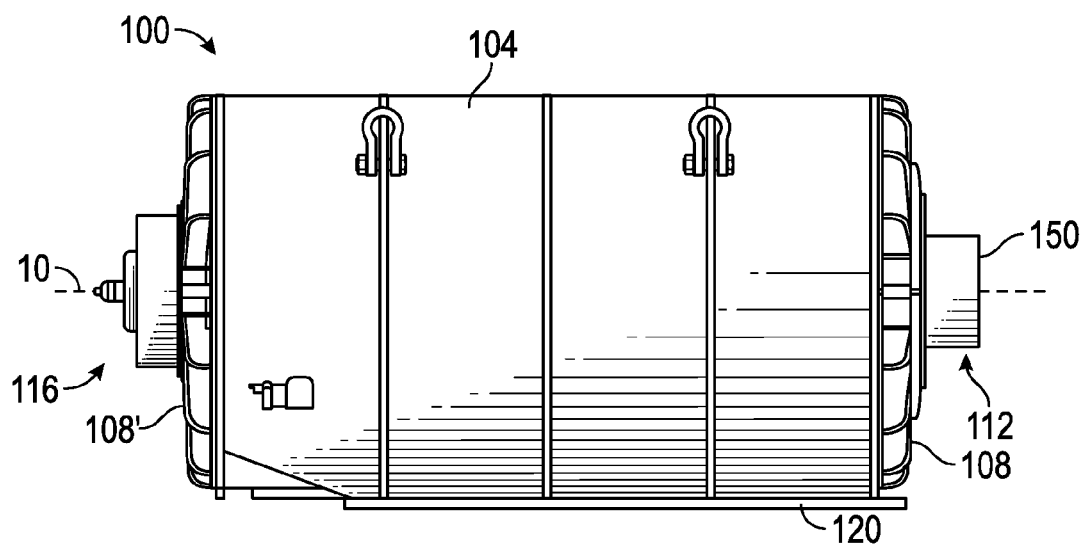
FIG. 4 is a side view of the superconducting electrical machine of FIG. 1.

Referring to FIG. 4, a side view of a superconducting electrical machine 100 is shown. The superconducting electrical machine 100 may include a stator frame 104, a pair of bracket assemblies 108, 108' disposed at a drive end 112 and at a non-drive end 116 of the superconducting electrical machine 100, and a base 120 disposed below the stator frame 104 to support the superconducting electrical machine 100. A longitudinal axis 10 may pass through the superconducting electrical machine 100. The superconducting electrical machine 100 may include a rotor 150, the rotor 150 being coannular with the stator frame 104. The rotor 150 may be supported in the superconducting electrical machine 100 by the pair of bracket assemblies 108, 108'.

Figure 5:
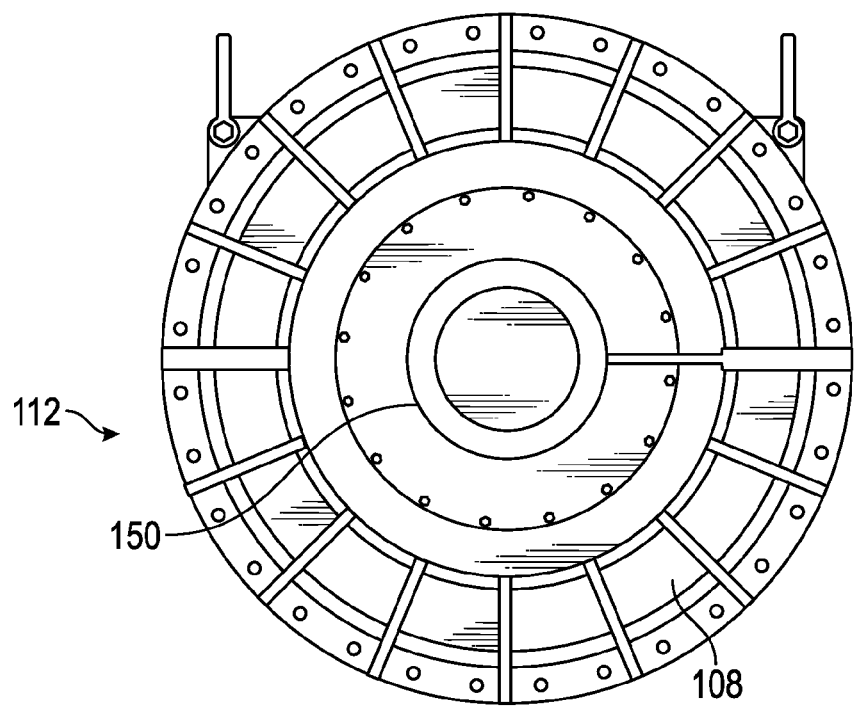
FIG. 5 is an end view of the drive end of the superconducting electrical machine of FIG. 1.

Referring to FIG. 5, an end view of a superconducting electrical machine 100 including a drive end 112 is shown. The drive end 112 may be located at an end region of the superconducting electrical machine 100 proximate to a prime mover, such as a wind turbine. The superconducting electrical machine 100 may include a bracket assembly 108 disposed at the drive end 112. The bracket assembly 108 may surround and be coannular with a bearing (e.g., bearing 180 shown in FIG. 11). In some embodiments, the bearing 180 is an anti-friction bearing 180, and the bearing 180 accommodates rotation of a rotor 150. The bearing 180 may surround and be coannular with a portion of the rotor 150. In some embodiments, the bearing 180 receives a shaft from a prime mover for rotating the rotor 150.

Figure 6:
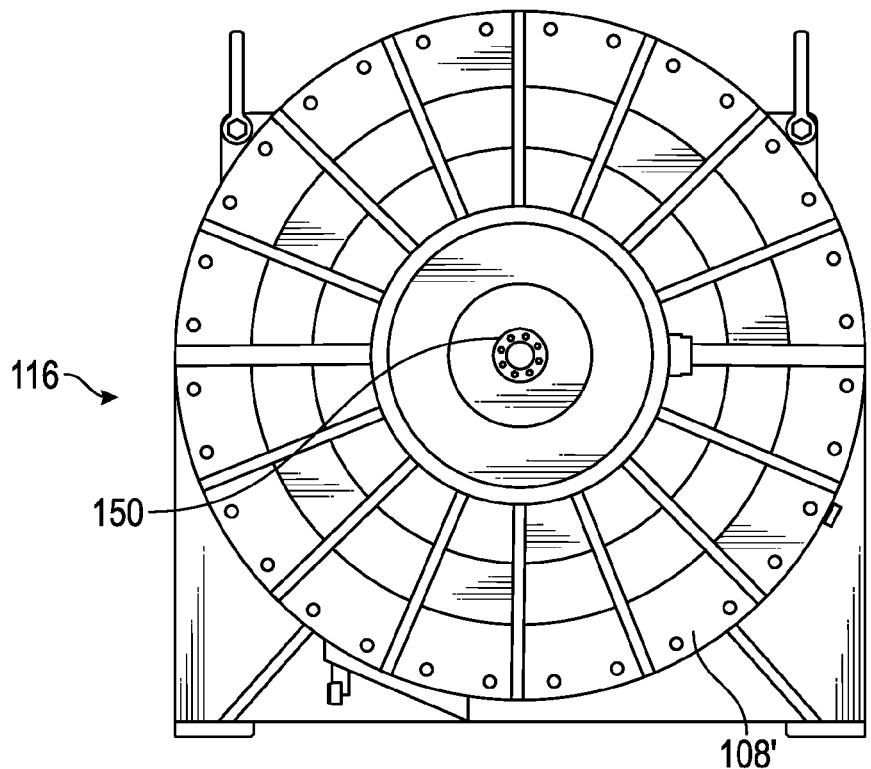
FIG. 6 is an end view of the non-drive end of the superconducting electrical machine of FIG. 1

Referring to FIG. 6, an end view of a superconducting electrical machine 100 including a non-drive end 116 is shown. The non-drive end 116 may be located at an end region of the superconducting electrical machine 100 distal from a prime mover, such as a wind turbine, and opposite from a drive end (e.g. drive end 112 shown in FIG. 5). The superconducting electrical machine 100 may include a bracket assembly 108' disposed at the non-drive end 116. The bracket assembly 108' may surround and be coannular with a bearing 180' (e.g., bearing 180' shown in FIG. 11). In some embodiments, the bearing 180' is an anti-friction bearing 180', and the bearing 180' accommodates rotation of a rotor 150. The bearing 180' may surround and be coannular with a portion of the rotor 150.

Figure 7:
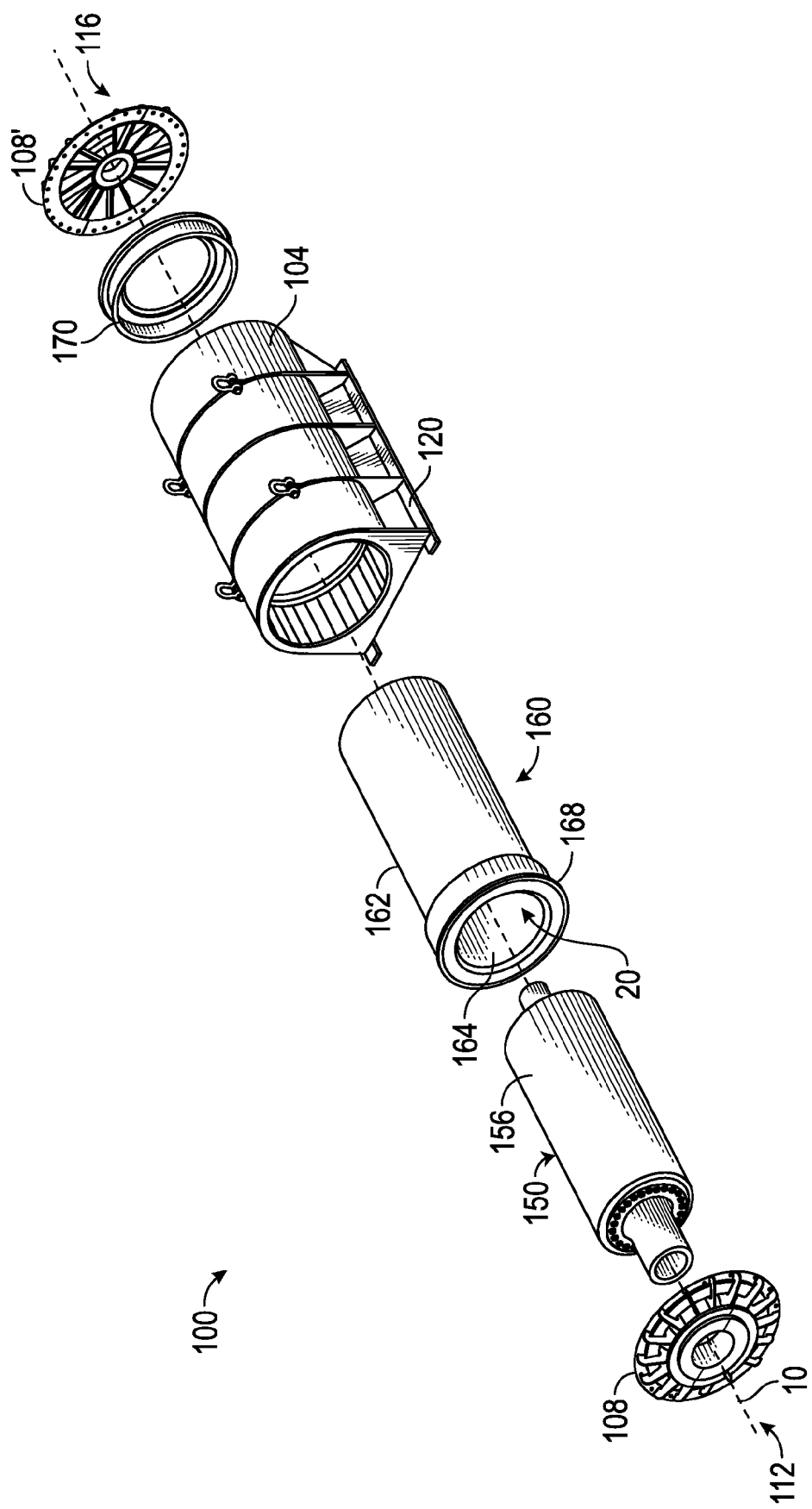
FIG. 7 is an exploded perspective view of the superconducting electrical machine of FIG. 1.

Referring to FIG. 7, an exploded view of various components of a superconducting electrical machine 100 is shown. The superconducting electrical machine 100 may include a stator frame 104 attached to a base 120. The superconducting electrical machine 100 may include a pair of bracket assemblies 108, 108' disposed at a drive end 112 and a non-drive end 116 of the superconducting electrical machine 100. The superconducting electrical machine 100 may include a rotor 150 supported by the bracket assemblies 108, 108' and which rotates about a longitudinal axis 10.

The superconducting electrical machine 100 may include a stator 160 to be supported in the stator frame 104. As shown in FIG. 7, the stator 160 includes an active section 162, and superconductive processes (e.g., electrical conduction with zero electrical resistance) may occur in the active section 162. FIG. 7 also shows a stator re-entrant drive end 168 disposed at a drive end 112 of the stator 160, and a stator re-entrant non-drive end 170 disposed at non-drive end 116 of the stator 160. Re-entrant ends, such as the stator non-drive re-entrant end 170, provide an elongated pathway for thermal conduction from the stator 160 to the environment surrounding the superconducting electrical machine 100, improving the ability of the superconducting electrical machine 100 to maintain the superconducting temperatures required for superconductive processes to occur. Superconducting temperatures may include cryogenic temperatures. A containment device, such as a stator cryostat 164, may enclose the active section 162 of the stator 160 and define a cavity 20 in which the rotor 150 may be disposed. In some embodiments, an air gap remains between the stator 160 and the rotor 150 after the rotor 150 has been positioned within the cavity 20 (see, e.g., air gap 184 shown in FIG. 12B).

The stator cryostat 164 may be composed of a bore tube assembly including a cylindrical tube and end caps, the stator re-entrant ends 168, 170, and the stator frame 104. The stator cryostat 164 components may be sealed (e.g., hermetically sealed) and/or welded together to complete the stator cryostat 164 in order to provide the vacuum environment for the stator 160.

Figure 8A:
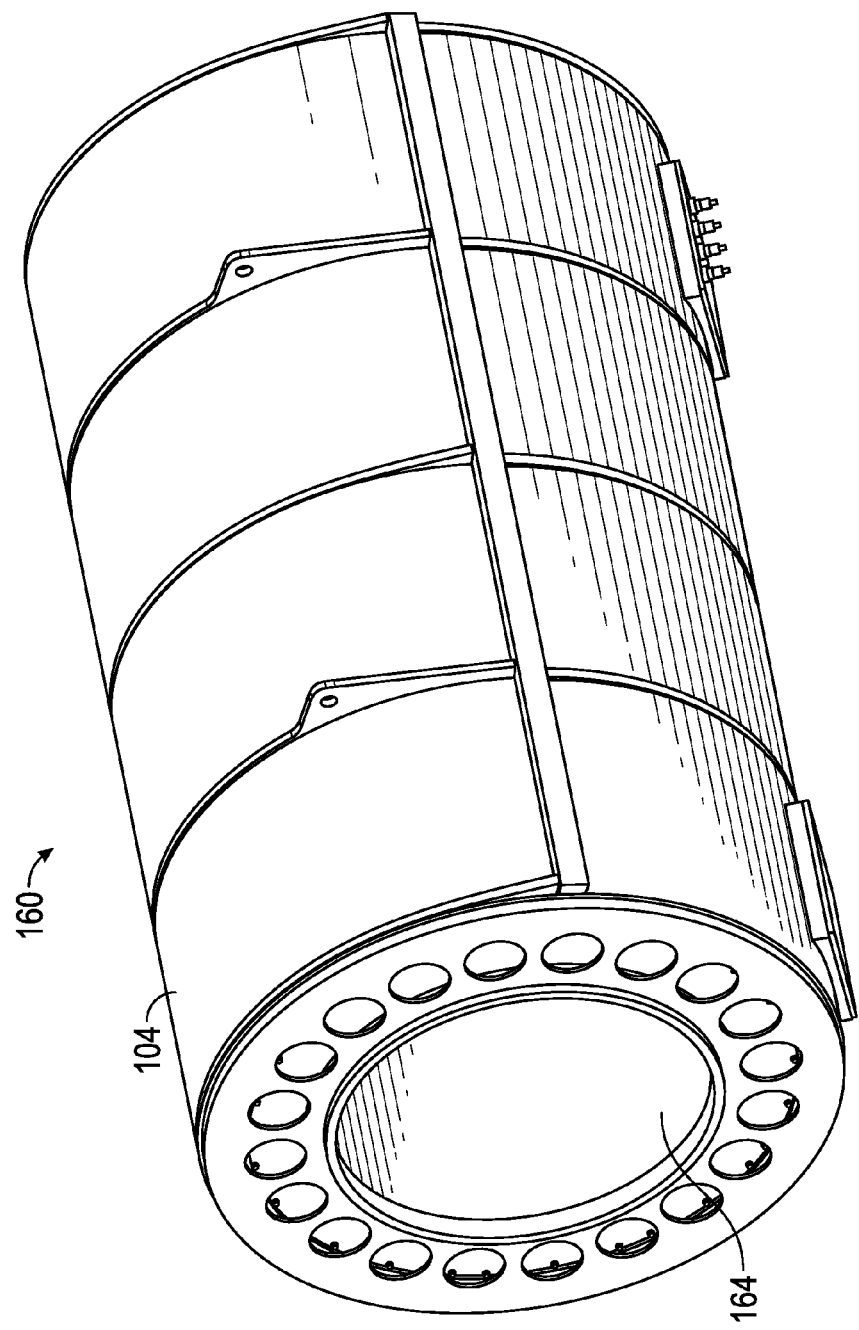
FIG. 8A is a perspective view of a stator having a stator cryostat in accordance with one embodiment.
Figure 8B:
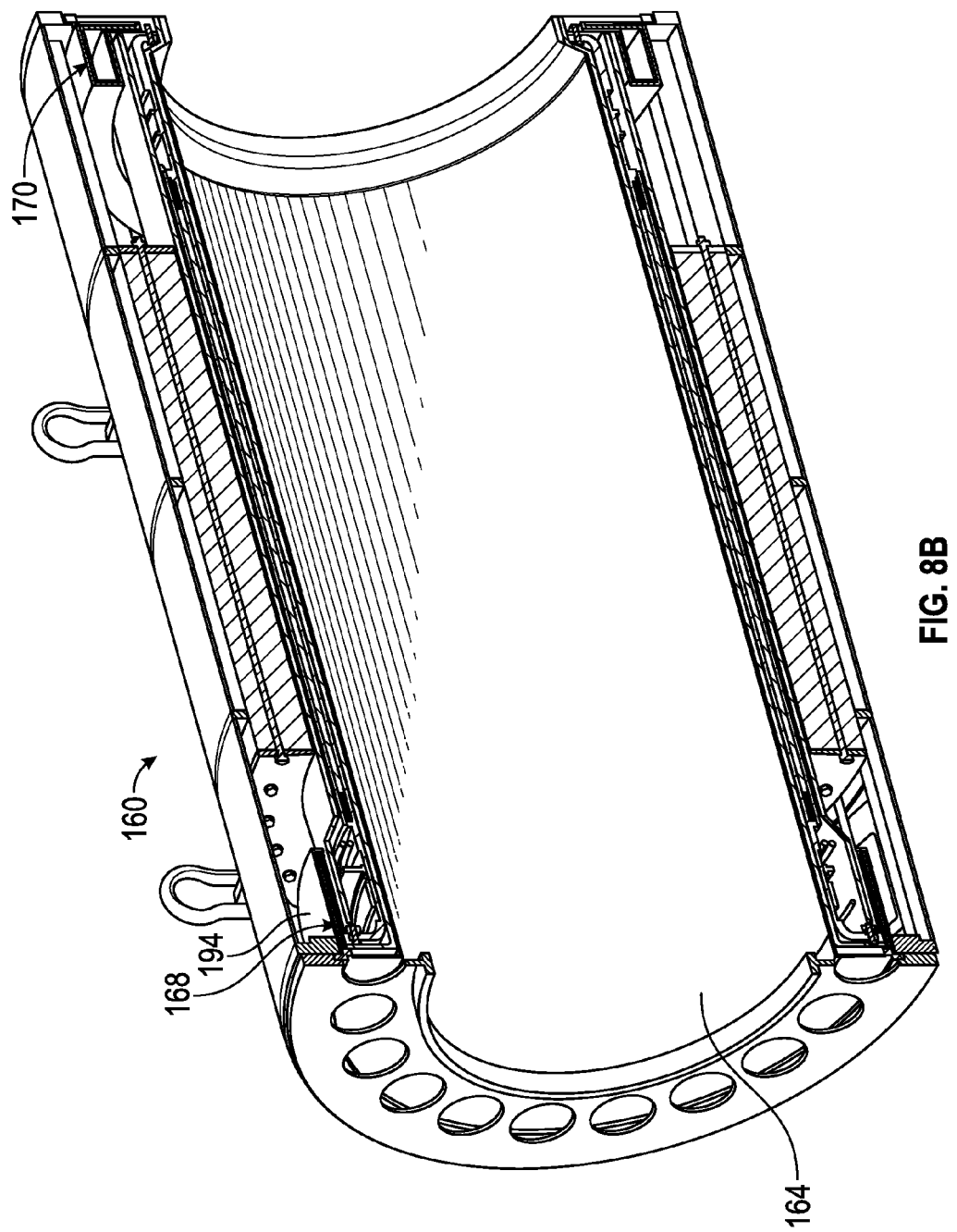
FIG. 8B is a cross-sectional view of the stator of FIG. 8A.

Referring to FIGS. 8A-8B, a stator 160 is shown. The stator 160 may be supported by a stator frame 104. The stator 160 may include a containment device, such as a stator cryostat 164, for maintaining a vacuum environment in the stator 160. The stator cryostat 164 may surround an active section 162 in which superconducting processes occur. In some embodiments, multi-layer insulation 194 is disposed along a re-entrant drive end 168 and a re-entrant non-drive end 170 of the stator 160. The re-entrant ends 168, 170 improve the ability of the stator 160 to maintain a superconducting temperature by increasing a resistance to heat transfer from the stator 160 to an environment surrounding the stator 160, by increasing a length along which conduction of thermal energy occurs from the stator 160 to the environment surrounding the stator 160. The multi-layer insulation 194 supplements the re-entrant ends 168, 170 by increasing a resistance to heat transfer by radiation. Although the figures illustrate the insulator 194 in specific locations, the insulator 194 may preferentially be disposed along a variety of surfaces, such as surfaces of a stator active section (see, e.g., stator active section 162 shown in FIG. 16A), in order to minimize heat transfer to the stator active section 162 from other surfaces with greater temperatures. The insulator 194 may preferentially be disposed along surfaces within the stator 160 that are in thermal communication with other surfaces having greater temperatures. The insulator 194 may be disposed along surfaces that would otherwise have line of sight to surfaces at room temperature, in order to mitigate radiative heat transfer. In some embodiments, the stator cryostat 164 improves the performance of the multi-layer insulation 194 by providing a sufficient vacuum within the stator 160. For example, a cryostat may provide a cold vacuum pressure of less than 1e-4 Torr, and the multi-layer insulation may have an effective thermal conductivity of approximately 0.1 [milli-Watt/meter-Kelvin].

Figure 9A:
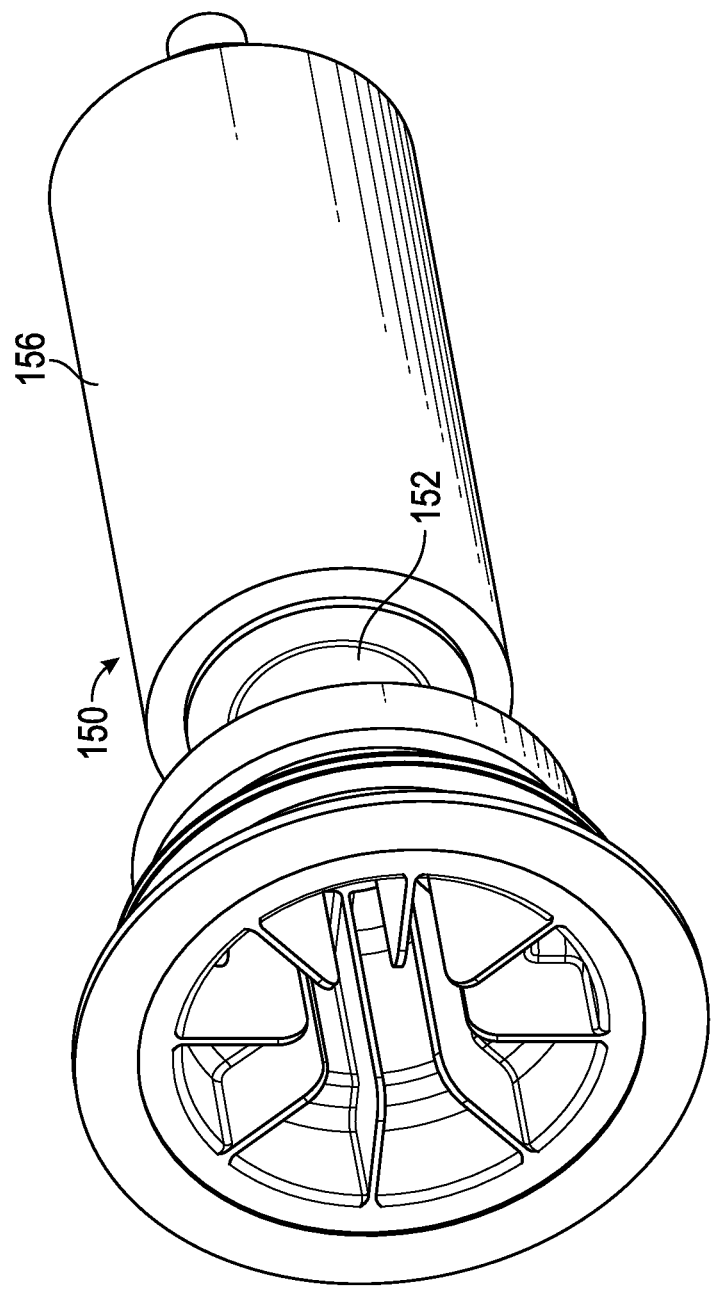
FIG. 9A is a perspective view of a rotor having a rotor cryostat in accordance with one embodiment.
Figure 9B:
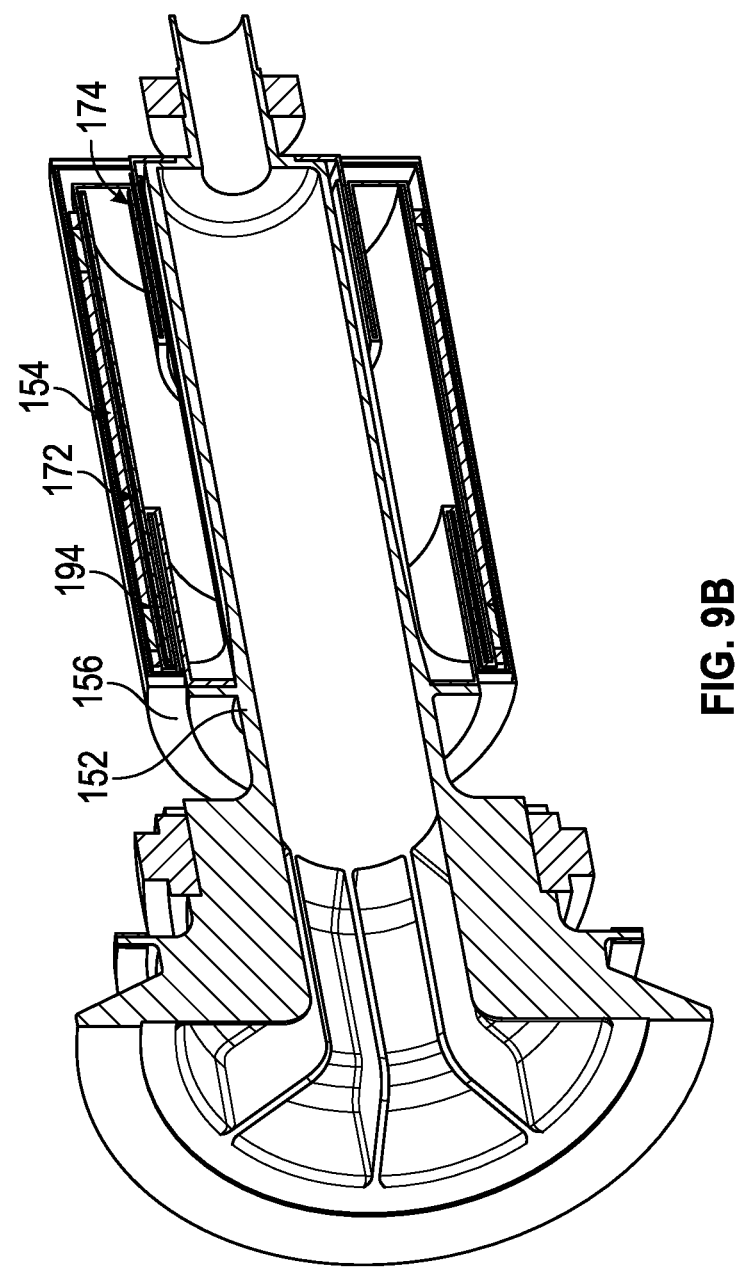
FIG. 9B is a cross-sectional view of the rotor of FIG. 9A.

Referring to FIGS. 9A-9B, a rotor 150 is shown. The rotor may include a containment device, such as a rotor cryostat 156, for maintaining a vacuum environment in the rotor 150. The rotor 150 may surround and be driven by a shaft. The rotor cryostat may border an active section 154 in which superconducting processes occur. In some embodiments, multi-layer insulation 194 is disposed along a re-entrant drive end 172 and a re-entrant non-drive end 174 of the rotor 150. The re-entrant ends 172, 174 improve the ability of the rotor 150 to maintain a superconducting temperature by increasing a resistance to heat transfer between the rotor 150 and an environment surrounding the rotor 150, by increasing a length along which conduction of heat occurs from the rotor to the environment surrounding the rotor 150. The multi-layer insulation 194 supplements the re-entrant ends 172, 174 by increasing a resistance to heat transfer by radiation. Although the figures illustrate the insulator 194 in specific locations, the insulator 194 may preferentially be disposed along a variety of surfaces, such as surfaces of a rotor active section (see, e.g., rotor active section 154 shown in FIG. 16B), in order to minimize heat transfer to the rotor active section 154 from other surfaces with greater temperatures. The insulator 194 may preferentially be disposed along surfaces within the rotor 150 that are in thermal communication with other surfaces having greater temperatures. The insulator 194 may be disposed along surfaces that would otherwise have line of sight to surfaces at room temperature, in order to mitigate radiative heat transfer. In some embodiments, the rotor cryostat 156 improves the performance of the multi-layer insulation 194 by providing a sufficient vacuum within the rotor 150. For example, a rotor cryostat 156 may provide a cold vacuum pressure of less than 1-e4 Torr, and the multi-layer insulation 194 may have an effective thermal conductivity of approximately 0.1 [milliWatt/meter-Kelvin].

In some embodiments, a rotor cryostat 156 includes an external enclosure and an internal enclosure. The external enclosure is welded to the exterior end surfaces of the re-entrant ends 172, 174, and the internal enclosure is welded to the interior end surfaces of the re-entrant ends 172, 174. The interfaces of these components are sealed in order to provide a vacuum chamber.

In some embodiments, a cryostat, such as a rotor cryostat 156 or a stator cryostat 164, includes a composite as a containment wall. In some embodiments, the composite prevents eddy current losses which would otherwise occur in an electrically conductive, metal cryostat wall. In some embodiments, a cryostat is all non-magnetic metal.

Figure 10:
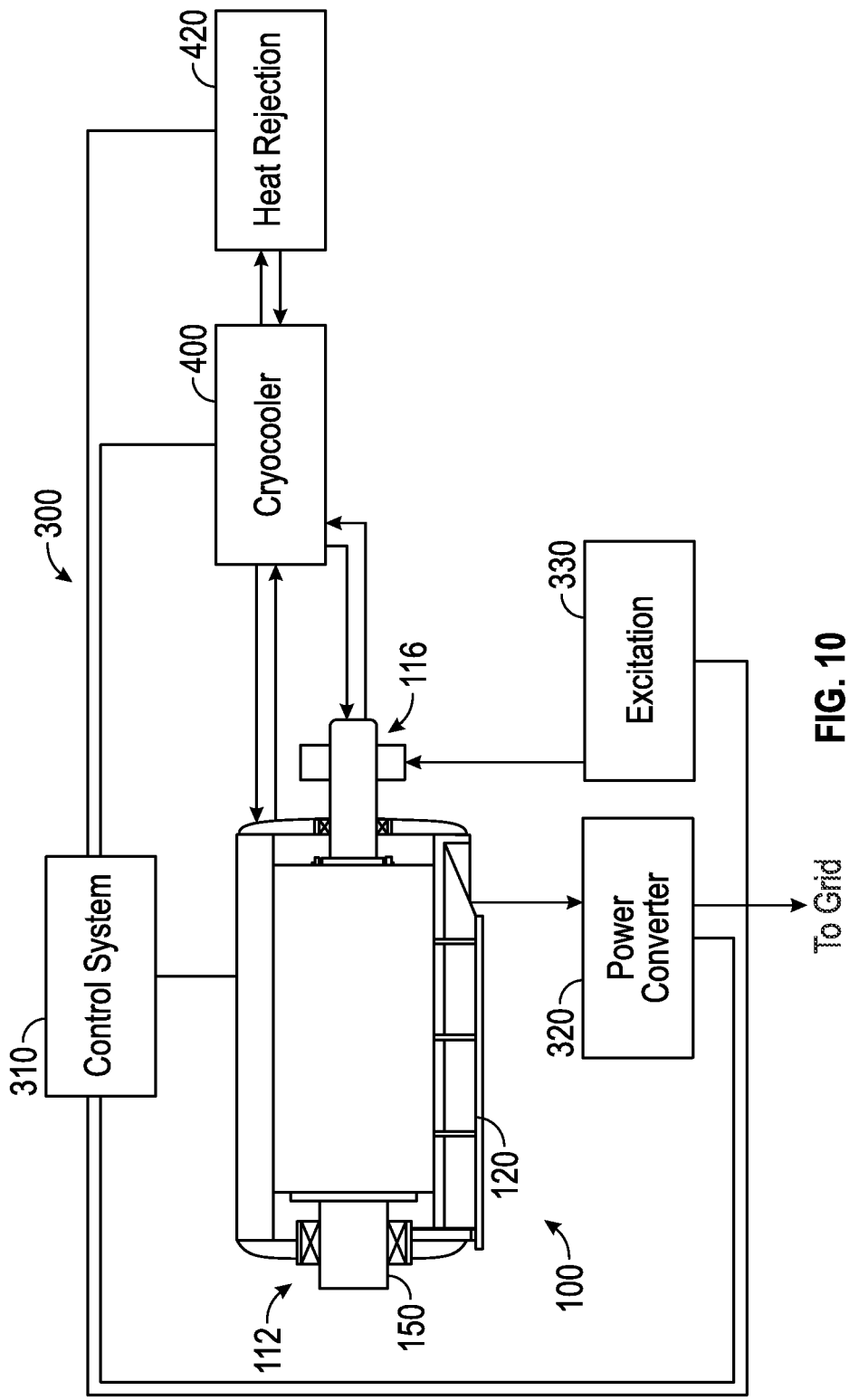
FIG. 10 is a schematic diagram of a system including a superconducting electrical machine in accordance with one embodiment.

Referring to FIG. 10, a system 300 for operating a superconducting electrical machine 100 is shown. The system 300 includes a superconducting electrical machine 100, a control system 310, a power converter 320, an excitation device 330, a cryocooler 400, and a heat rejection unit 420. The control system 310 may control operation of the various components of system 300. For example, the control system 310 may modulate the rotation of a rotor 150, depending on factors including but not limited to the rotation rate of a shaft from a prime mover such as a wind turbine (e.g., wind turbine 128 shown in FIG. 2).

The cryocooler 400 may control the flow rates of coolants provided to the superconducting electrical machine 100 in order to control a temperature within the superconducting electrical machine 100. A temperature may include a temperature of a stator, a temperature of a rotor 150, a temperature of components of the stator or of the rotor 150, etc. (see, e.g., stator 160 shown in FIGS. 8A-8B). The cryocooler 400 may control the flow rates of the coolants in order to maintain a temperature within the superconducting electrical machine 100 at or below a superconducting temperature. Temperatures within the superconducting electrical machine 100 may be measured in a variety of ways (e.g., temperatures may be measured using sensors disposed throughout the superconducting electrical machine, etc.).

The power converter 320 may convert electrical energy generated by the superconducting electrical machine 100 to a form compatible with electrical components outside of system 300. For example, the superconducting electrical machine 100 may generate variable frequency power, which may be rectified and inverted before transmission to an electrical grid.

The excitation device 330 may provide an excitation current to the rotor 150 so that rotor windings (e.g., rotor windings 216 shown in FIGS. 12A-12B) of the rotor 150 may generate a magnetic field. In some embodiments, a control system 310 controls operation of the excitation device 330 to dynamically modulate the excitation current in response to conditions including but not limited to wind conditions. In some embodiments, a change in the excitation current leads to an inductive voltage, requiring power to be supplied from the excitation device 330 to the rotor 150. For example, as shown in FIG. 10, the excitation device 330 provides power to the rotor 150 near the non-drive end 116 of the rotor 150. In some embodiments, the excitation current is modulated over long time constants (e.g., several minutes) in response to conditions including but not limited to wind conditions and/or for providing variable speed operation.

The cryocooler 400 may be coupled to a superconducting electrical machine 100, and the cryocooler 400 may drive a cooling cycle, such as a reverse-Brayton cycle, in order to provide coolants to the superconducting electrical machine 100. The coolants may pass from the cryocooler 400, which has cooled the coolants to a temperature at or below a superconducting temperature, through cooling tubes in the active sections of a rotor 150 and a stator (e.g., stator 160 shown in FIG. 7; rotor cooling tubes 220 and stator cooling tubes 224 shown in FIG. 12B). The coolants may draw thermal energy from the active sections, and particularly the superconductors of the rotor 150 and the stator 160 (e.g. rotor windings 216 and stator windings 228 showing in FIG. 13, etc.). By drawing thermal energy from the active sections, the coolants help maintain the superconductors at or below a superconducting temperature. After drawing thermal energy from the active sections, the relatively warm coolant may return to the cryocooler 400, and the cycle may begin again.

In some embodiments, the coolant includes gaseous helium. Cryocooler 400 may include a Turbo-Brayton cryocooler which provides a coolant of helium (e.g., helium gas having a temperature of approximately 15-20 Kelvin, etc.) to a rotor 150 and to a stator (e.g., stator 160 shown in FIG. 7). Cryocooler 400 may also provide a coolant of helium at a relatively warmer temperature (e.g., helium gas having a temperature of 60 Kelvin, etc.) as an additional heat sink to the stator 160. After passing through the cooling tubes within the superconducting electrical machine 100 and receiving thermal energy from the superconducting electrical machine 100, the relatively warm coolant may return through the cryocooling process, developing waste heat handled by the heat rejection system 420.

Figure 11:
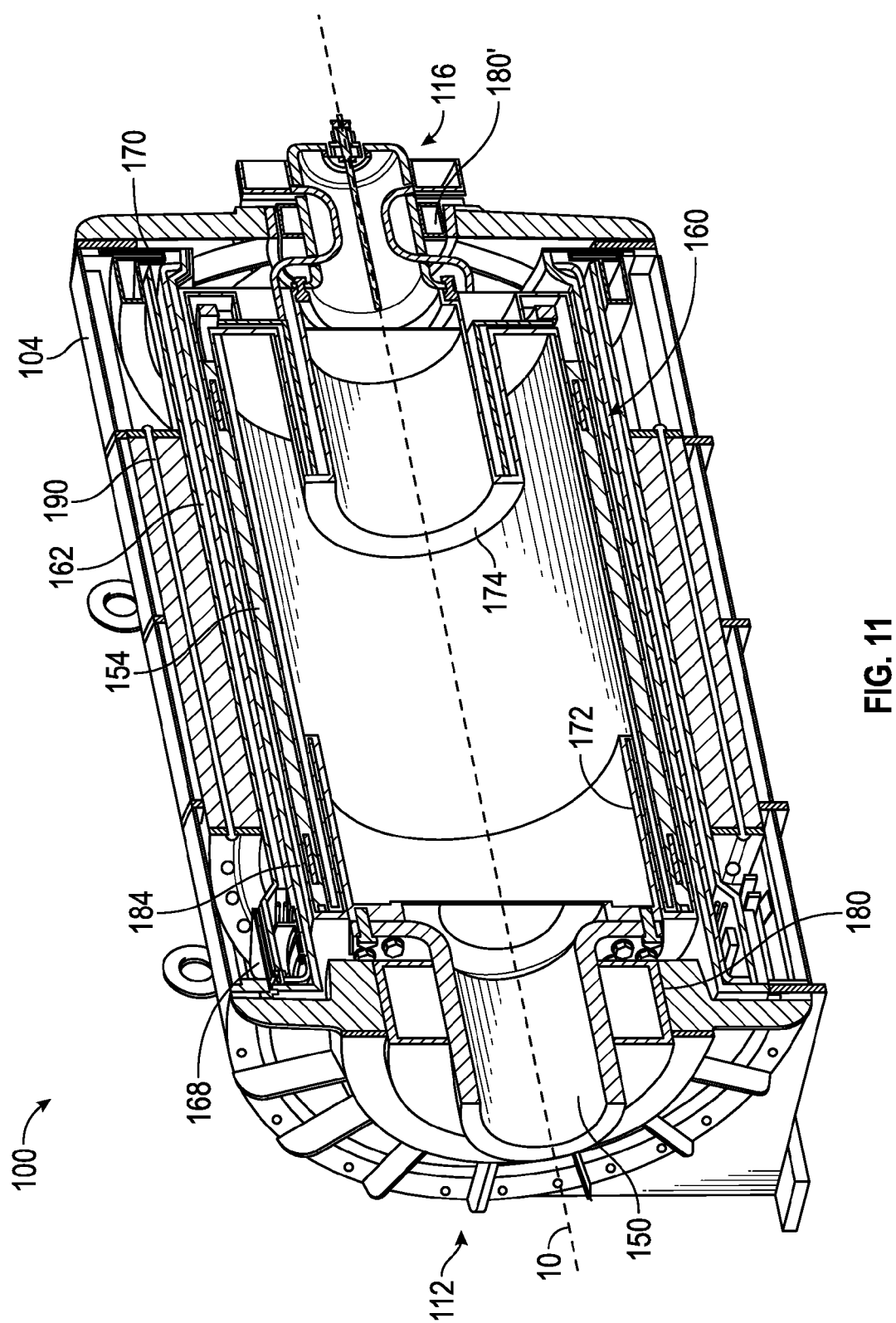
FIG. 11 is a cross-sectional view of a superconducting electrical machine in accordance with one embodiment.

Referring to FIG. 11, a cross-section of a superconducting electrical machine 100 is shown. Superconducting electrical machine 100 includes a rotor 150 and a stator 160. The rotor 150 may be coupled to a shaft (e.g., shaft 124 shown in FIG. 2) and may be rotated by the shaft 124 about a longitudinal axis 10 when the shaft 124 rotates. A rotor cryostat (e.g., rotor cryostat 156 shown in FIGS. 9A-9B) may act as an enclosure for the rotor 150, enclosing components such as a rotor active section 154, in order to provide a vacuum environment at or below a superconducting temperature within the rotor 150. A stator cryostat (e.g., stator cryostat 164 shown in FIGS. 8A-8B) may act as an enclosure for the stator 160, enclosing components such as a stator active section 162, in order to provide a vacuum environment at or below a superconducting temperature within the stator 160. A gap 184 may be disposed between the rotor cryostat 156 and stator cryostat 164. The rotor 150 may be supported in the superconducting electrical machine 100 by a pair of bearings 180, 180' which surround and are coannular with the rotor 150, and are disposed at the drive end 112 and the non-drive end 116 of the superconducting electrical machine 100. A pair of bracket assemblies 108, 108' may surround and support the pair of bearings 180, 180', and in turn, support the rotor 150.

The rotor 150 may include a rotor active section 154, in which superconductive processes occur. The rotor 150 may include a rotor re-entrant drive end 172 and a rotor re-entrant non-drive end 174. The re-entrant ends 172, 174 may provide an extended path along which thermal conduction occurs from the rotor to an environment surrounding the superconducting electrical machine 100, which increases a resistance to thermal conduction, thus facilitating maintaining the superconducting electrical machine 100 at or below a superconducting temperature. Re-entrant ends, such as the rotor re-entrant drive end 172 and a rotor re-entrant non-drive end 174, also provide radial and axial flexibility to accommodate thermal expansion and/or thermal contraction of the active section 154.

The stator 160 may be disposed generally surrounding and coannular with the rotor 150. The stator 160 may be supported by a stator frame 104. The stator 160 may include a stator re-entrant drive end 168 and a stator re-entrant non-drive end 170. The re-entrant ends 168, 170 may provide an extended path along which thermal conduction occurs from the rotor to an environment surrounding the superconducting electrical machine 100, which increases a resistance to thermal conduction, thus facilitating maintaining the superconducting electrical machine 100 at or below a superconducting temperature. Re-entrant ends, such as the stator re-entrant drive end 168 and stator non-drive end 170, also provide radial and axial flexibility to accommodate thermal expansion and/or thermal contraction of an active section 162.

An electromagnetic shield 190 may be provided in a stator 160 to shield against communication of electrical signals and magnetic energy across a boundary of the stator frame 104 and the superconducting electrical machine 100. In some embodiments, the electromagnetic shield 190 includes a laminated shield.

Figure 12A:
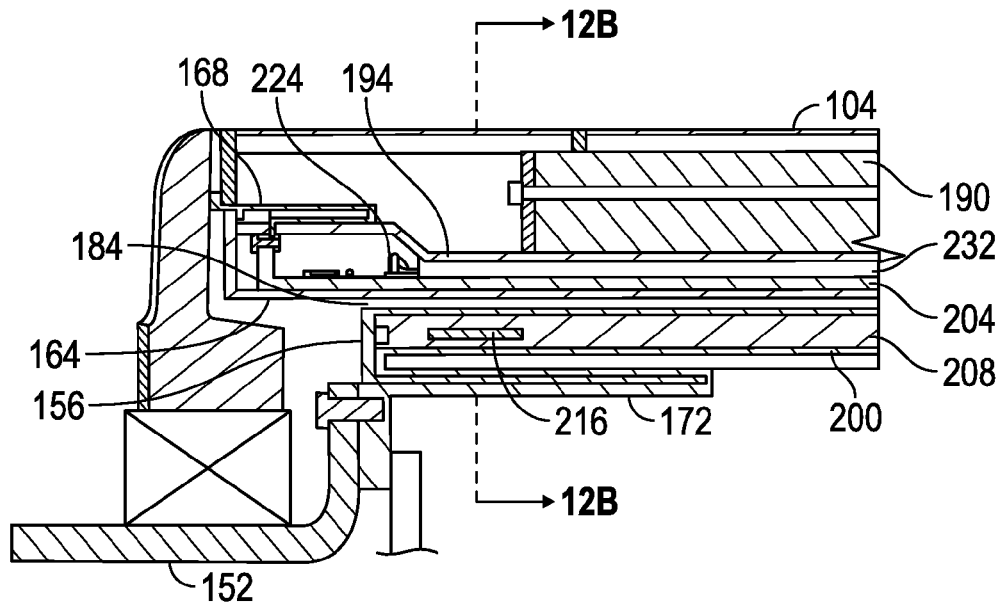
FIG. 12A is a sectional view of a superconducting electrical machine in accordance with one embodiment.
Figure 12B:
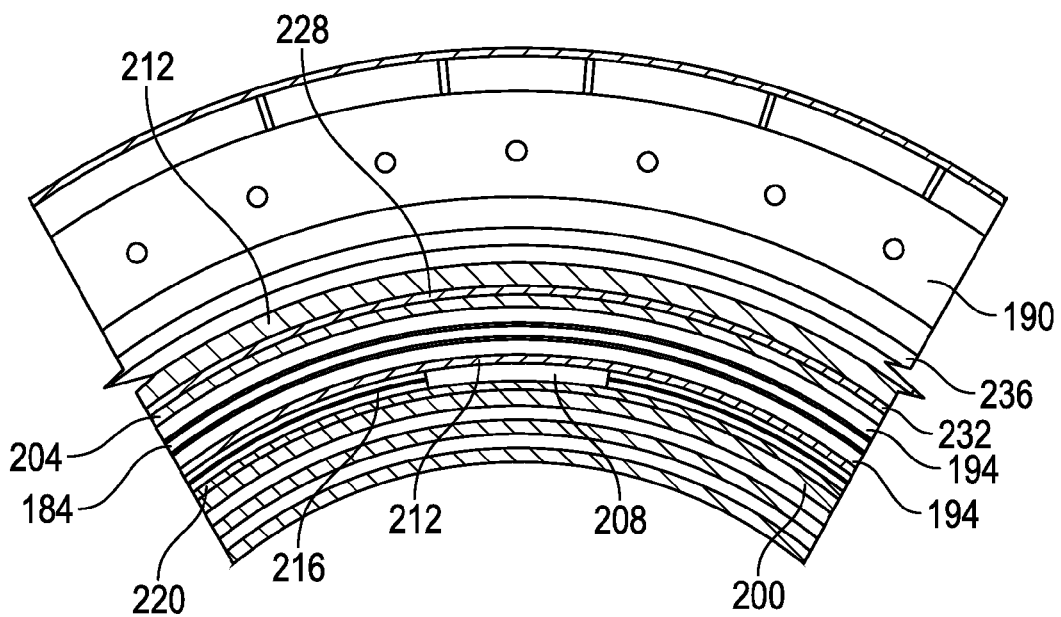
FIG. 12B is a sectional view of the superconducting electrical machine of FIG. 12A.

Referring to FIGS. 12A-12B, a section of a superconducting electrical machine 100 is shown. In some embodiments, a rotor (e.g., rotor 150 shown in FIG. 11) includes a rotor torque tube 200 surrounded by a rotor composite 208. The rotor composite 208 may include an epoxy resin and filler configured to compensate for a volume change of the rotor. The rotor composite 208 may surround and support rotor windings 216 and rotor cooling tubes 220. Rotor cooling tubes 220 may be disposed between the rotor torque tube 200 and the rotor windings 216 in order to draw thermal energy from the rotor windings 216. An air gap 184 may be provided between the rotor 150 and a stator when the rotor 150 is positioned within a cavity defined by a stator cryostat enclosing the stator (see, e.g., stator 160, stator cryostat 164 shown in FIGS. 8A-8B). The stator 160 may be disposed coannular with the rotor 150 and on an opposite side of the air gap 184. The stator may include stator cooling tubes 224 to draw thermal energy from the stator windings 228. A stator composite 232 may surround and support the stator windings 228 and stator cooling tubes 224. The stator composite 208 may be surrounded by a stator retention layer 212. An electromagnetic shield 190 may be provided along an outer region of the stator 160 to provide magnetic isolation to the superconducting electrical machine 100.

The rotor composite 208 may be surrounded by a rotor retention layer 212. The rotor retention layer 212 may provide additional structural support to the rotor 150 during a change in temperature from a first temperature to a second temperature, and may also provide additional structural support to the rotor 150 during operation of the superconducting electrical machine 100.

Figure 13:
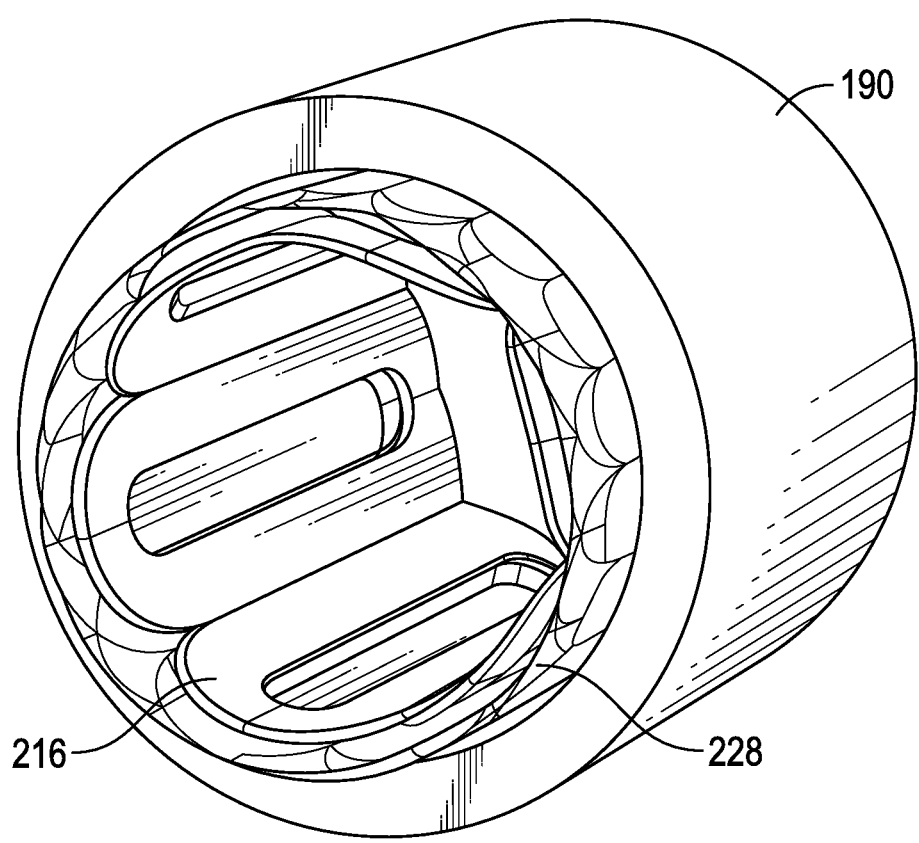
FIG. 13 is a perspective view of the active section and rotor windings and stator windings of a superconducting electrical machine in accordance with one embodiment.

Referring to FIG. 13, a superconducting electrical machine 100 including active sections in which superconducting processes occur is shown. The superconducting electrical machine 100 includes an electromagnetic shield 190. The electromagnetic shield 190 surrounds stator windings 228. The superconducting electrical machine 100 also includes a rotor (e.g., rotor 150 shown in FIG. 11) including rotor windings 216. In some embodiments, superconductors, such as rotor windings 216 and stator windings 228, are arranged in a multiple-pole configuration. For example, in FIG. 14, rotor windings 216 are shown in a six-pole configuration. In various embodiments, superconductors may be arranged in various configurations (e.g. 2 poles, 4 poles, 10 poles, etc.). In some embodiments, the superconducting windings, such as rotor windings 216 and stator windings 228, may be arranged in layers. For example, in FIG. 13, the stator windings 228 are shown in a three-layer arrangement.

Figure 14:
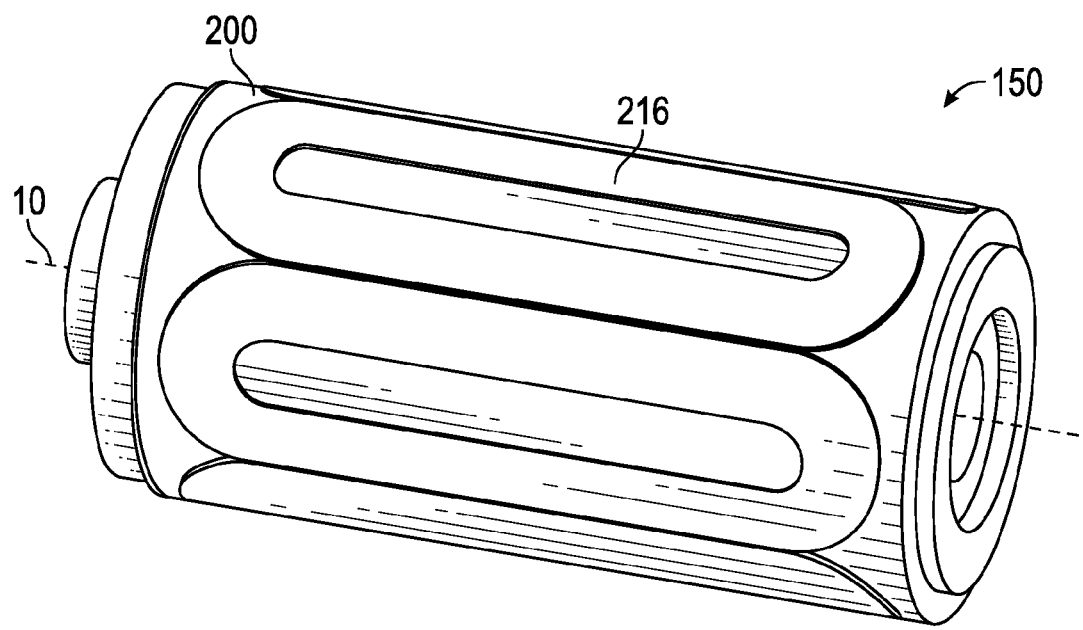
FIG. 14 is a perspective view of the active section of a rotor showing the winding placement for a superconducting electrical machine in accordance with one embodiment.

Referring to FIG. 14, a portion of a rotor 150 is shown. The rotor 150 may rotate about a longitudinal axis 10. The rotor 150 may include a rotor torque tube 200. The rotor torque tube 200 may be coannular with and surround an outer surface of a shaft (e.g., shaft 152 shown in FIG. 12A), and may transfer mechanical rotational energy from the shaft to a rotor active section (e.g., rotor active section 154 shown in FIG. 11) that is coannular with and surrounds an outer surface of the torque tube 200. The rotor active section 154 may include a rotor composite (e.g., rotor composite 208 shown in FIG. 12A) which supports rotor windings 216 and rotor cooling tubes (e.g., rotor cooling tubes 220 shown in FIG. 16B). Rotor cooling tubes 220 may be disposed along an outer surface of the rotor torque tube 200, allowing for heat transfer from the rotor active section 154 to coolants passing through the rotor cooling tubes 220. In some embodiments, the rotor cryostat 156 provides a vacuum enclosure for the rotor 150 such that a flow rate of coolants necessary to maintain the rotor 150 at a superconducting temperature is relatively lessened.

Figure 15:
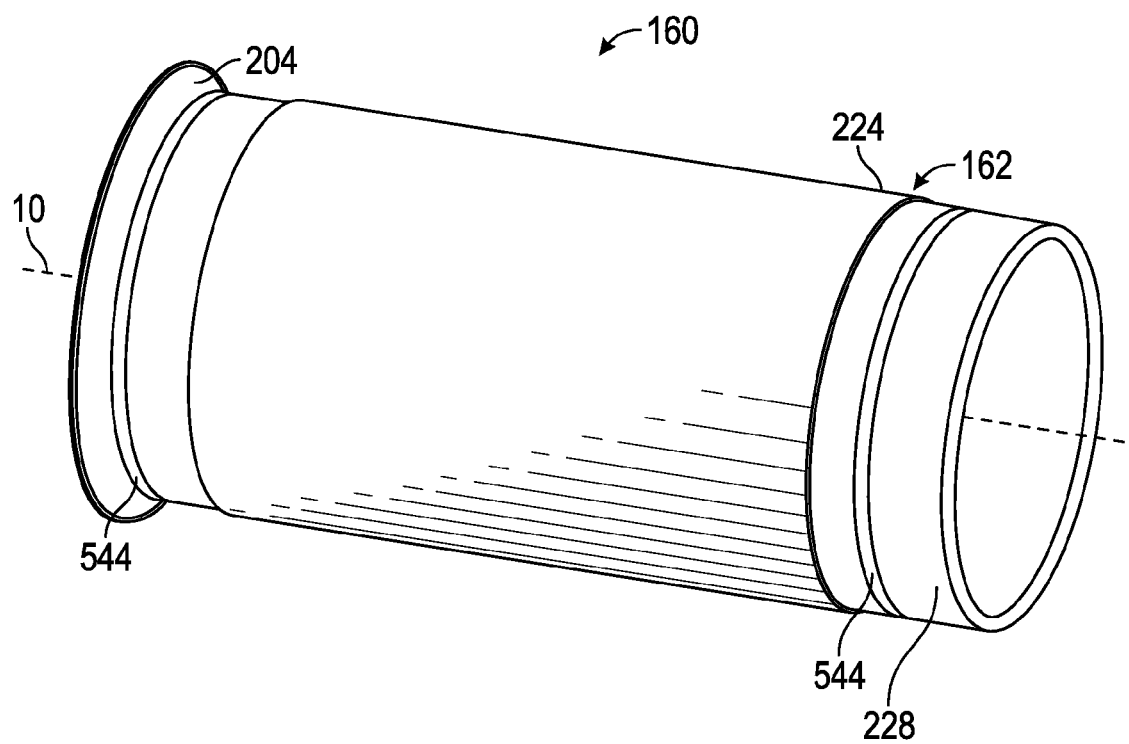
FIG. 15 is a perspective view of the active section and outer layers of a stator of a superconducting electrical machine in accordance with one embodiment.

Referring to FIG. 15, a portion of a stator 160 is shown. The stator 160 may be coannular with a longitudinal axis 10. The stator 160 may include an active section 162 including a stator composite (e.g., stator composite 232 shown in FIG. 16A) which supports stator windings 228 and stator cooling tubes 224. Stator cooling tubes 224 may be disposed along an outer surface of the stator composite 232, allowing for heat transfer from the active section 162 to coolants passing through the stator cooling tubes 224. In some embodiments, heat sink rings 544 are disposed proximate to the stator active section 162, stator composite 232, stator windings (e.g., stator windings 228 shown in FIG. 13, etc.), and/or a re-entrant end of the stator 160 (e.g., re-entrant end 168 shown in FIG. 12A, etc.). The heat sink rings 544 may provide a flow of coolants at a temperature that is greater than the temperature of the coolants passing through the cooling tubes 224. In some embodiments, the coolants passing through the heat sink rings 544 include helium at a temperature of 60 Kelvin. In some embodiments, a stator cryostat provides a vacuum enclosure for the stator 160 such that a flow rate of coolants necessary to maintain the stator 160 at a superconducting temperature is relatively lessened (see, e.g., stator cryostat 164 shown in FIGS. 8A-8B).

Figure 16A:
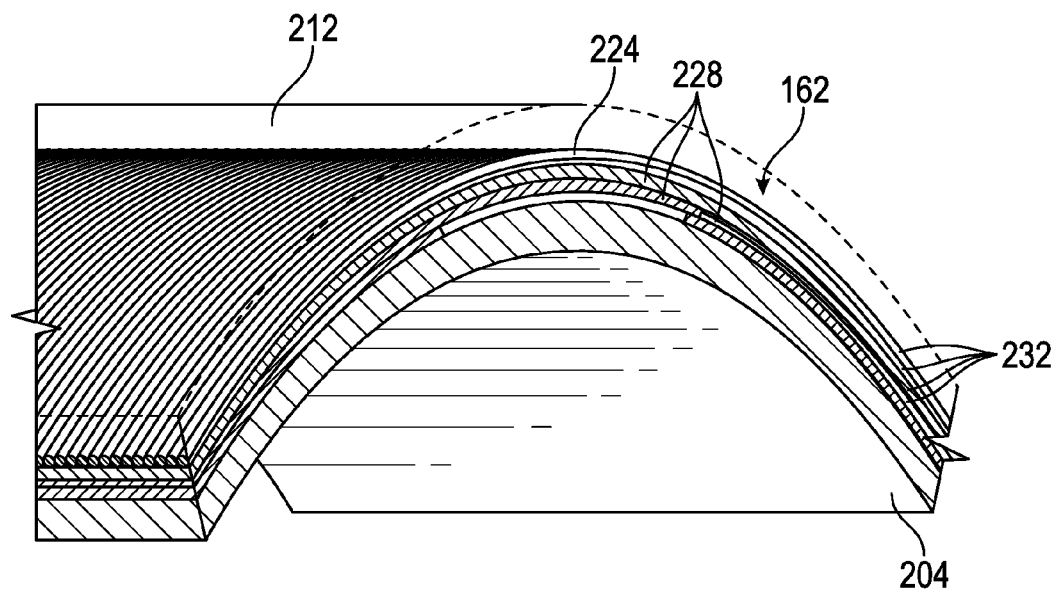
FIG. 16A is a partial view of the active section and various layers of a stator of a superconducting electrical machine in accordance with one embodiment.

Referring to FIG. 16A, various layers of a stator (e.g., stator 160 shown in FIG. 8A) are shown. In some embodiments, the stator 160 includes a stator torque tube 204 supporting a stator active section 162. A stator composite 232 supports stator windings 228 and stator cooling tubes 224. Stator cooling tubes 224 may be disposed along an outer surface of the stator composite 232, in order to provide a flow of coolants at or below a superconducting temperature. A stator retention layer 212 may be disposed along an outer surface of the stator composite 232 and/or stator active section 162 in order to provide additional structural support to the stator 160 during a change in temperature from a first temperature to a second temperature, as well as during operation of the superconducting electrical machine 100.

Figure 16B:
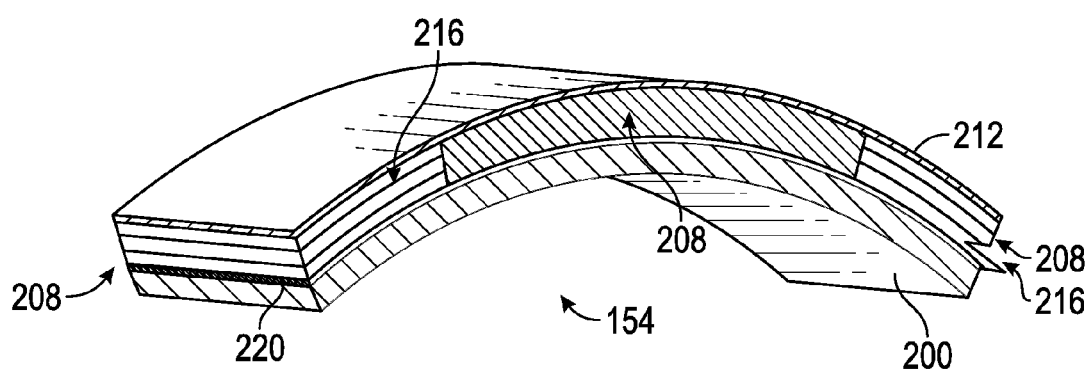
FIG. 16B is a partial view of the active section and various layers of a rotor of a superconducting electrical machine in accordance with one embodiment.

Referring to FIG. 16B, various layers of a rotor (e.g., rotor 150 shown in FIG. 9) are shown. In some embodiments, the rotor 150 includes a rotor torque tube 200 supporting a rotor active section 154. A rotor composite 208 supports rotor windings 216 and rotor cooling tubes 220. A rotor retention layer 212 may be disposed along an outer surface of the rotor composite 208 and may provide additional structural support to the rotor 150, such as during operation of the superconducting electrical machine 100 at or below a superconducting temperature. Rotor cooling tubes 220 may be disposed between the rotor torque tube 200 and the rotor active section 154 in order to provide a flow of coolants at a temperature at or below a superconducting temperature.

Figure 17:
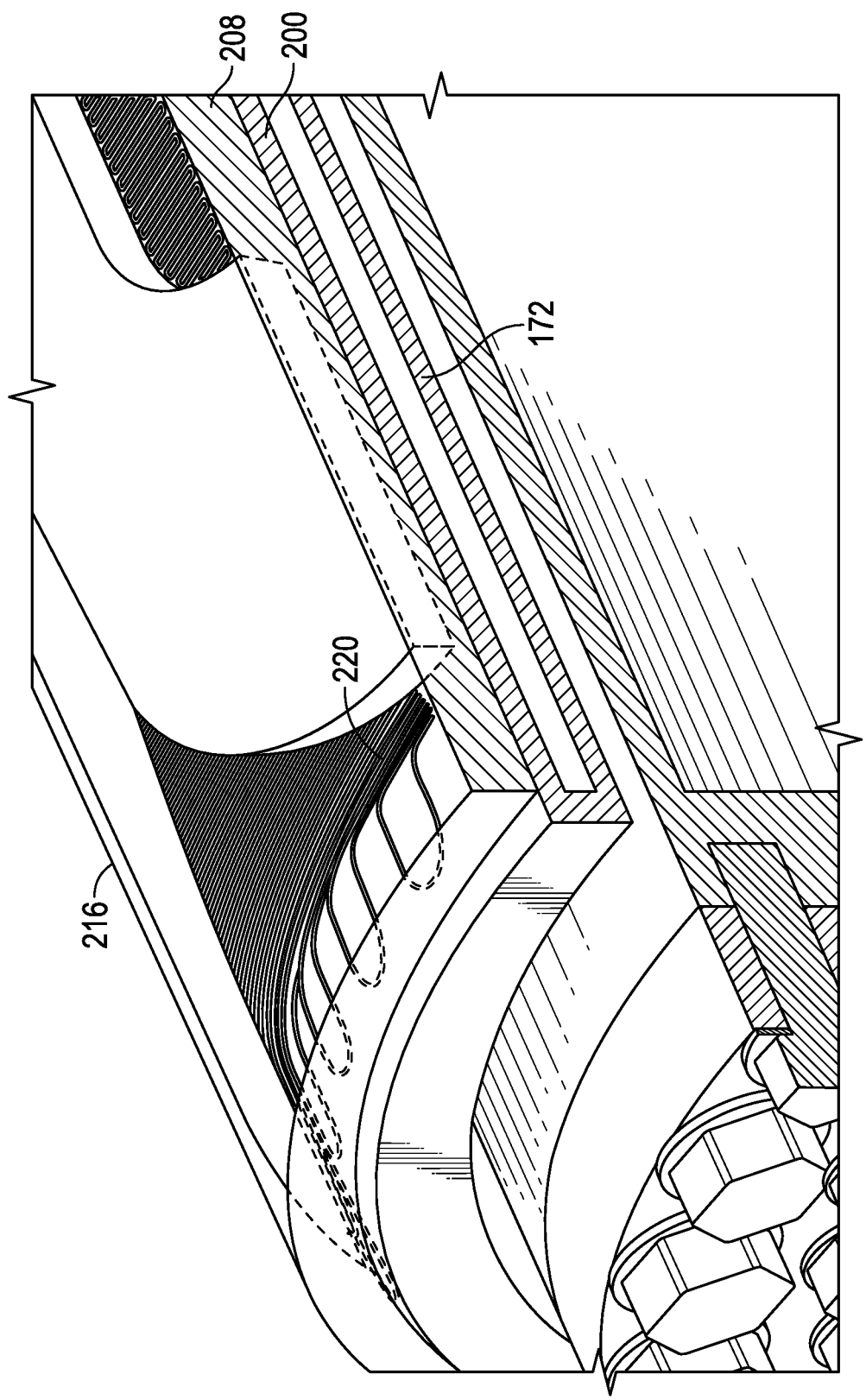
FIG. 17 is a cutaway view of the active sections of a rotor of a superconducting electrical machine in accordance with one embodiment.

Referring to FIG. 17, a rotor 150 is shown. Rotor re-entrant drive end 172 provides an extended path along which thermal conduction may proceed from the rotor 150 to an environment surrounding superconducting electrical machine 100. Rotor cooling tubes 220 may be provided along an outer surface of a rotor torque tube 200. In some embodiments, rotor cooling tubes 220 are arranged in a wound configuration in order to optimize the surface area between the rotor cooling tubes 220 and rotor composite 208, in order to optimize the rate of heat transfer from the rotor windings 216 to the coolant passing through the rotor cooling tubes 220. A rotor torque tube 200 may be provided to support the rotor composite 208. A rotor cryostat (e.g., rotor cryostat 156 shown in FIGS. 9A-9B, etc.) encloses the rotor 150 and provides a vacuum environment for the rotor 150 in order to maintain the rotor 150 at or below a superconducting temperature.

Figure 18:
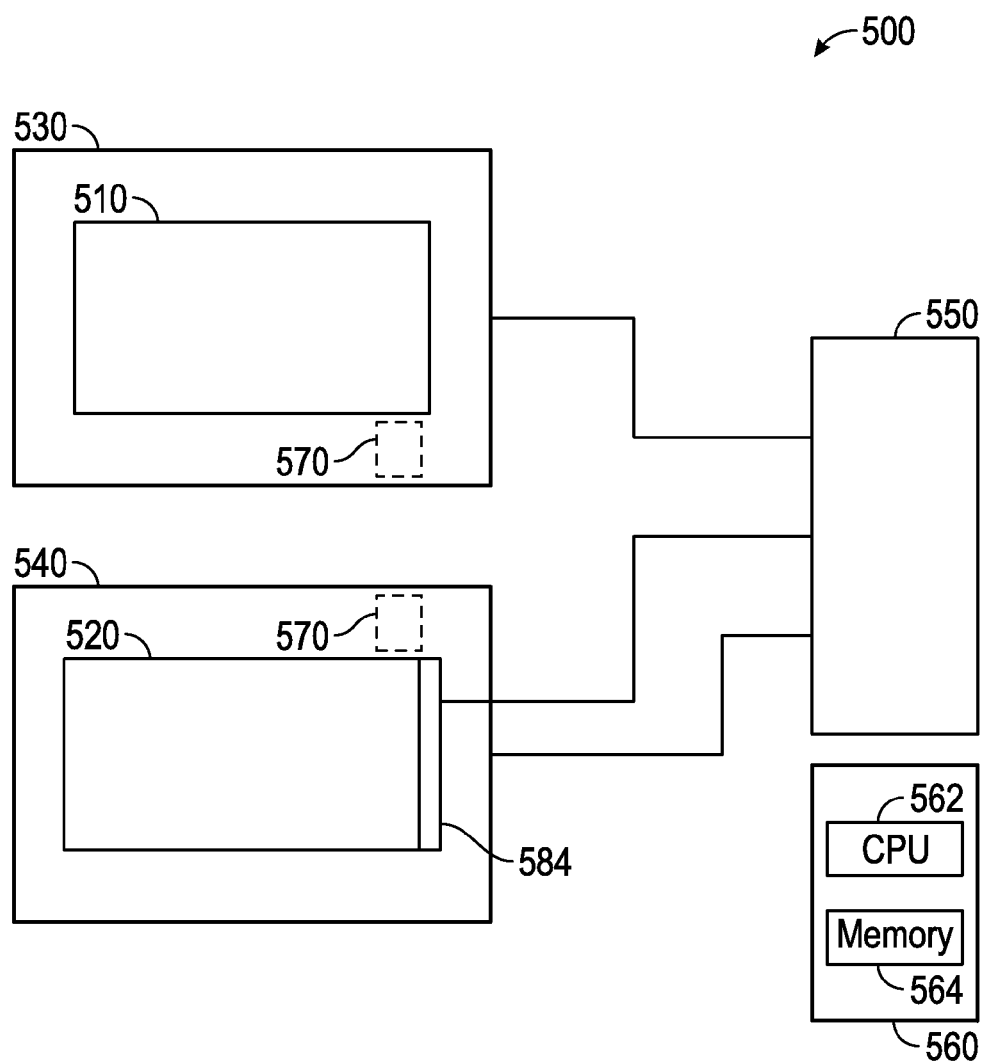
FIG. 18 is a schematic diagram of a superconducting cryostat system in accordance with one embodiment.

Referring to FIG. 18, a system 500 for maintaining a superconductor at a superconducting temperature is shown. The system 500 includes a first superconductor 510, a second superconductor 520, a first containment device 530 (e.g., a cryostat such as rotor cryostat 156 shown in FIG. 7, etc.) enclosing the first superconductor 510, and a second containment device 540 (e.g., a cryostat such as stator cryostat 164 shown in FIG. 7, etc.) enclosing the second superconductor 520.

The first superconductor 510 may include superconducting windings that are configured to superconduct when a temperature of the first superconductor 510 is at or below a first superconducting temperature. The first containment device 530 may be configured to allow transport of a first coolant through a plurality of conduits contained by the first containment device 530, in order to maintain a first temperature within the first containment device 530 at a value no greater than the first superconducting temperature.

The second superconductor 540 may include superconducting windings that are configured to superconduct when a temperature of the second superconductor is at or below a second superconducting temperature. The second containment device 540 may be configured to allow transport of a second coolant through a plurality of conduits contained by the second containment device 540, in order to maintain a second temperature within the second containment device at a value no greater than the second superconducting temperature.

In some embodiments, the system 500 includes a cooling device 550 (e.g., cryocooler 400 shown in FIG. 10, etc.) that is coupled to the first containment device 530 and the second containment device 540. The cooling device 550 may be configured to deliver a first flow of the first coolant to the first containment device and a second flow of the second coolant to the second containment device. In some embodiments, at least one of the first coolant and the second coolant is helium.

In some embodiments, the cooling device 550 is configured to operate a reverse Brayton cycle in order to set a first coolant temperature of the first coolant and a second coolant temperature of the second coolant. In some embodiments, at least one of the first coolant temperature and the second coolant temperature is a temperature greater than zero Kelvin and less than or equal to 93 Kelvin. In some embodiments, at least one of the first coolant temperature and the second coolant temperature is greater than or equal to four Kelvin and less than or equal to 35 Kelvin. For example, the first coolant may include helium having a first coolant temperature set to 15 Kelvin, and the second coolant may include helium having a second coolant temperature set to 15 Kelvin.

In some embodiments, the system 500 includes at least one heat sink device 584 disposed adjacent to the second superconductor 520. The cooling device 550 is coupled to the heat sink device 584 and the cooling device is configured to deliver a third flow of a third coolant to the heat sink device 584. For example, the third coolant may have a third coolant temperature higher than the first coolant or the second coolant. In some embodiments, the third coolant includes helium having a third coolant temperature set to 60 Kelvin.

In some embodiments, the system 500 includes sensors 570 disposed within at least one of the first containment device 530 and the second containment device 540. The sensors 570 may be temperature sensors configured to detect a temperature within the first containment device 530 and/or the second containment device 540. The sensors 570 may be pressure sensors configured to detect a pressure within the first containment device 530 and/or the second containment device 540. For example, the sensors 570 may be configured to detect a pressure in a containment device, and the processing circuit 560 may be configured to monitor the pressure and output a signal, display an alert, modify the pressure, or perform other operations, based on whether the pressure is greater than a reference vacuum pressure (e.g., 1e-4 [Torr], etc.).

In some embodiments, the system includes a processing circuit 560 configured to control operation of the cooling device 550 to modify at least one of a first flow of a first coolant and a second flow of a second coolant.

Figure 19A:
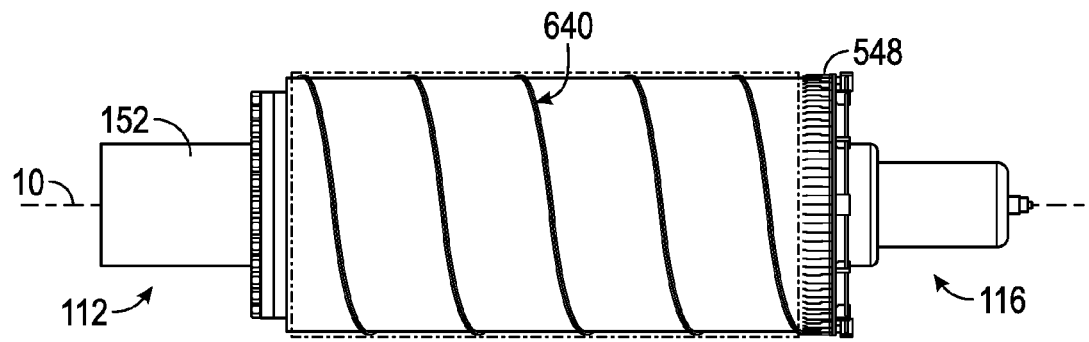
FIG. 19A is a side view of a cooling circuit of a rotor of a superconducting electrical machine in accordance with one embodiment.
Figure 19B:
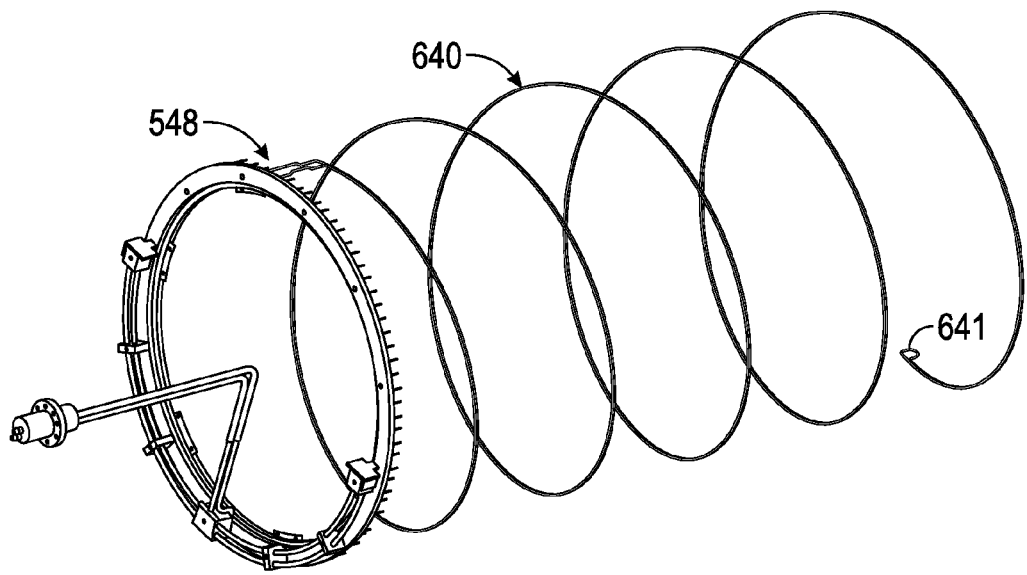
FIG. 19B is a perspective view of the cooling circuit of FIG. 19A.

Referring to FIGS. 19A-19B, a cooling tube circuit 640 for a rotor 150 is shown. In some embodiments, a composite is applied onto a rotor torque tube 200. Grooves may be machined into the composite to accommodate the cooling tube circuit 640; a layer of composite may then be added on top of the cooling tube circuit 640. The cooling tube circuit 640 may be cast in with a pourable composite. The cooling tube circuit 640 may follow a helical path, beginning and returning to manifolds 548 (e.g., manifolds 548 may include a supply manifold and a return manifold). While FIGS. 19A-19B show a single cooling tube circuit 640, a plurality of such cooling tube circuits 640 may be used.

In some embodiments, each cooling tube circuit 640 is in an out-and-back configuration, creating a current cancelling approach that minimizes losses in the cooling tubes themselves of the cooling tube circuit 640. The cooling tube circuit 640 may include a pair of tubes that run parallel to each other, with a first tube originating at a supply manifold, and a second tube returning to a return manifold. The first tube and second tube may be connected at an end 641 of the cooling tube circuit 640 distal from the supply and return manifolds, such that coolant travelling through the cooling tube circuit 640 follows a continuous path through the first tube and returning through the second tube.

The manifolds 548 may be coupled to a cryocooler (e.g. cryocooler 400 shown in FIG. 10), and the supply manifold may receive a first flow of a first coolant from the cryocooler 400 and deliver the first flow of the first coolant to the plurality of cooling tubes circuits 640. In some embodiments, the manifolds 548 are disposed at non-drive end 116 of a superconducting electrical machine 100. In some embodiments, the first flow of the first coolant draws thermal energy from the rotor 150, in order to maintain the rotor 150 at or below a superconducting temperature.

Figure 20A:
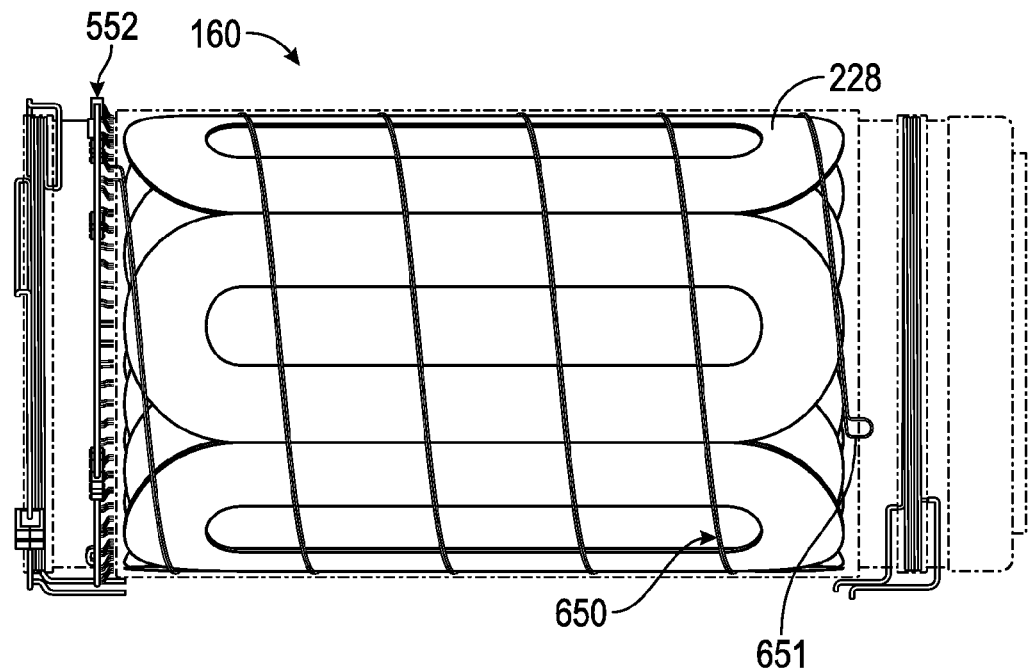
FIG. 20A is a side view of a cooling circuit of a stator of a superconducting electrical machine in accordance with one embodiment.
Figure 20B:
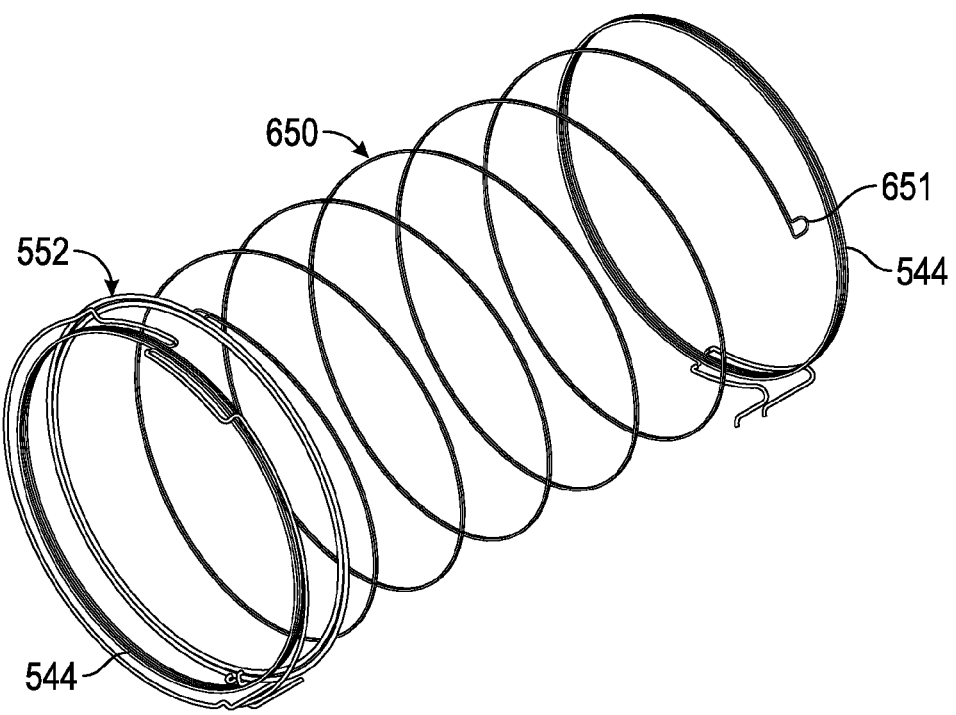
FIG. 20B is a perspective view of the cooling circuit of FIG. 20A.

Referring to FIGS. 20A-20B, a cooling tube circuit 650 for a stator 160 is shown. In some embodiments, the cooling tube circuit 650 is disposed radially outward from stator windings 228. The cooling tube circuit 650 may be disposed in a groove in a composite, or may be cast with a pourable composite. The cooling tube 650 may follow a helical path, beginning and returning to manifolds 552 (e.g., manifolds 552 may include a supply manifold and a return manifold). While FIGS. 20A-20B show a single cooling tube circuit 650, a plurality of such cooling tube circuits 650 may be used.

In some embodiments, each cooling tube circuit 650 is in an out-and-back configuration, creating a current cancelling approach that minimizes losses in the cooling tubes themselves of the cooling tube circuit 650. The cooling tube circuit 650 may include a pair of tubes that run parallel to each other, with a first tube originating at a supply manifold, and a second tube returning to a return manifold. The first tube and second tube may be connected at an end 651 of the cooling tube circuit 650 distal from the supply and return manifolds, such that coolant travelling through the cooling tube circuit 650 follows a continuous path through the first tube and returning through the second tube.

The manifolds 552 may be coupled to a cryocooler (e.g., cryocooler 400 shown in FIG. 10), and the supply manifold may receive a second flow of a second coolant from the cryocooler 400 and deliver the second flow of the second coolant to the plurality of cooling tube circuits 650. In some embodiments, the second flow of the second coolant draws thermal energy from the stator 160, in order to maintain the stator 160 at or below a superconducting temperature. In some embodiments, cooling duties for the stator 160 are divided between a second coolant (e.g., helium gas having a temperature of approximately 15 Kelvin, etc.) passing through the plurality of cooling tubes 650, and a third coolant (e.g., helium gas having a temperature of approximately 60 Kelvin, etc.) passing through a separate cooling circuit. The separate cooling circuit may incorporate heat sink rings 544 at either end of an active section of the stator (e.g., active section 162 shown in FIG. 16A, etc.).

Figure 21:
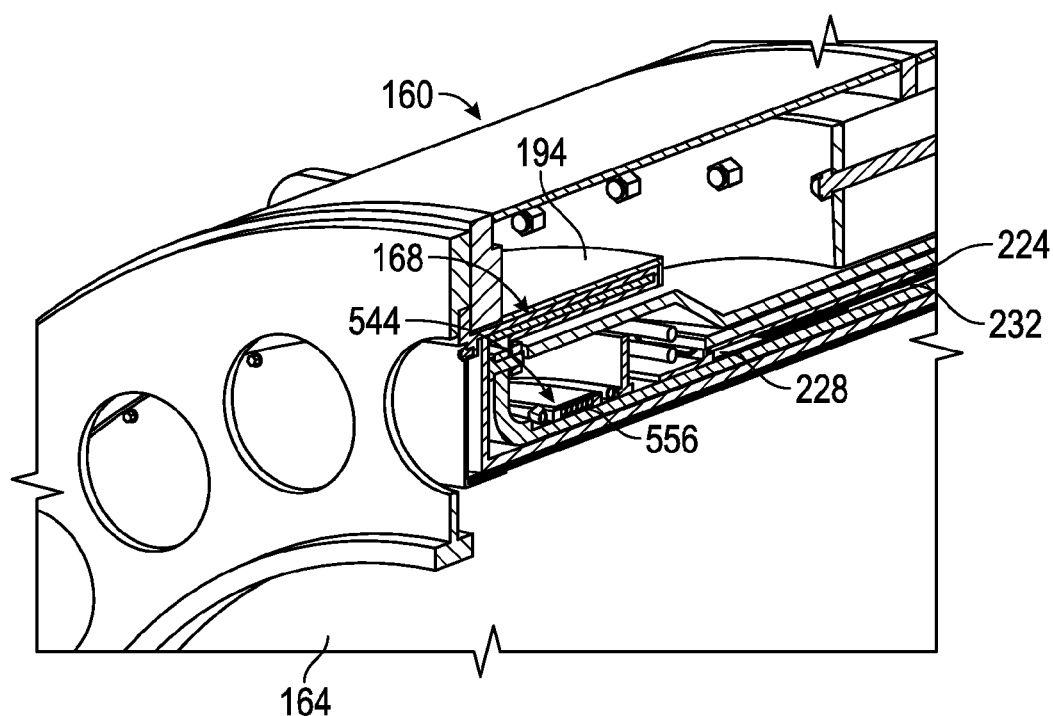
FIG. 21 is a partial view of a drive end region of a stator of a superconducting electrical machine in accordance with one embodiment.

Referring to FIG. 21, a portion of a stator 160 in a re-entrant drive end 112 region is shown. The stator 160 includes a stator cryostat 164 to provide a vacuum environment for the stator 160 in order to maintain the stator 160 at a temperature at or below a superconducting temperature. The stator includes stator windings 228 disposed in a stator composite 232. Cooling tubes 224 may be disposed adjacent to the stator windings 228 in order to draw thermal energy from the stator windings 228. In some embodiments, the stator 160 includes at least one heat sink ring 544 including heat sink cooling tubes 556, in order to provide a third flow of a third coolant at a third temperature greater than a first temperature of a first coolant and/or a second temperature of a second coolant. The stator 160 may include a re-entrant drive end 168, having multi-layer insulation 194 adjacent to the re-entrant drive end 168, in order to increase the resistance to heat transfer from the stator 160 to an environment remote from the stator 160.

As shown in the figures and described in the written description, a superconducting electrical machine 100 may be fully superconducting: both a rotor 150 and a stator 160 are capable of operating in a superconducting fashion, as rotor superconducting windings 216 and stator superconducting windings 228 are each able to superconduct when maintained at a temperature no greater than a superconducting temperature. In other embodiments, a superconducting electrical machine may be partially superconducting. For example, just a rotor, or just a stator, may be configured to superconduct. In some embodiments, only one of a rotor or a stator may be provided with a composite such as rotor composite 208 or stator composite 232. In some embodiments, only one of a rotor 150 or a stator 160 may be provided with cooling tubes, such as rotor cooling tubes 220 or stator cooling tubes 224, in order to maintain respective superconductors at or below a superconducting temperature. In some embodiments, only one of a rotor 150 or a stator 160 may be provided with a cryostat for maintaining a vacuum environment.

The construction and arrangement of the systems and methods as shown in the various exemplary embodiments are illustrative only. Although only a few embodiments have been described in detail in this disclosure, many modifications are possible (e.g., variations in size, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A superconducting electrical machine, comprising:
   a rotor comprising a rotor torque tube, a rotor composite surrounding the rotor torque tube, rotor windings supported by the rotor composite, and a plurality of first conduits disposed along an outer surface of the rotor composite, the rotor windings configured to superconduct when cooled in a rotor cryostat to a temperature no greater than a rotor superconducting temperature;
   a stator comprising a stator composite, stator windings supported by the stator composite, and a plurality of second conduits disposed along an outer surface of the stator composite, the stator windings configured to superconduct when cooled in a stator cryostat to a temperature no greater than a stator superconducting temperature;
   the rotor cryostat surrounding the rotor, wherein the rotor cryostat is configured to allow transport of a first coolant through the plurality of first conduits in order to draw heat from the rotor windings and reduce the temperature of the rotor windings to a temperature no greater than the rotor superconducting temperature; and
   the stator cryostat surrounding the stator, wherein the stator cryostat is configured to allow transport of a second coolant through the plurality of second conduits in order to draw heat from the stator windings and reduce the temperature of the stator windings to a temperature no greater than the stator superconducting temperature.

2. The superconducting electrical machine of claim 1, wherein at least one of the first coolant and the second coolant comprises helium.

3. The superconducting electrical machine of claim 1, wherein an inlet temperature of at least one of the first coolant and the second coolant is greater than zero Kelvin and less than or equal to 93 Kelvin.

4. The superconducting electrical machine of claim 1, wherein at least one of the rotor cryostat and the stator cryostat comprises a cryostat wall comprising a composite.

5. The superconducting electrical machine of claim 1, further comprising at least one heat sink disposed proximate to a stator active section, wherein a third coolant flows through the at least one heat sink.

6. The superconducting electrical machine of claim 1, wherein at least one of the rotor windings and the stator windings comprises magnesium diboride.

7. A superconducting electrical system, comprising:
   a rotor comprising a rotor torque tube, a rotor composite surrounding the rotor torque tube, rotor windings supported by the rotor composite, and a plurality of first conduits disposed along an outer surface of the rotor composite, the rotor windings configured to superconduct when cooled in a rotor cryostat to a temperature no greater than a rotor superconducting temperature;
   a stator comprising a stator composite, stator windings supported by the stator composite, and a plurality of second conduits disposed along an outer surface of the stator composite, the stator windings configured to superconduct when cooled in a stator cryostat to a temperature no greater than a stator superconducting temperature;
   the rotor cryostat enclosing the rotor, wherein the rotor cryostat is configured to allow transport of a first coolant through the plurality of first conduits in order to draw heat from the rotor windings and maintain the temperature of the rotor windings at a temperature no greater than the rotor superconducting temperature; and
   the stator cryostat enclosing the stator, wherein the stator cryostat is configured to allow transport of a second coolant through the plurality of second conduits in order to draw heat from the stator windings and maintain the temperature of the stator windings at a temperature no greater than the stator superconducting temperature; and
   a cryocooler, wherein the cryocooler is coupled to the rotor cryostat and configured to deliver a first flow of the first coolant to the rotor cryostat, and wherein the cryocooler is coupled to the stator cryostat and configured to deliver a second flow of the second coolant to the stator cryostat.

8. The superconducting electrical system of claim 7, wherein at least one of the first coolant and the second coolant comprises helium.

9. The superconducting electrical system of claim 7, wherein an inlet temperature of at least one of the first coolant and the second coolant is greater than zero Kelvin and less than or equal to 93 Kelvin.

10. The superconducting electrical system of claim 7, further comprising a heat sink disposed proximate to a stator active section, wherein the cryocooler is coupled to the heat sink and further configured to deliver a third flow of a third coolant to the heat sink.

11. The superconducting electrical system of claim 7, wherein the cryocooler is configured to operate a cooling cycle in order to set a first coolant temperature of the first coolant and a second coolant temperature of the second coolant.

12. The superconducting electrical system of claim 7, wherein at least one of the rotor cryostat and the stator cryostat comprises a containment wall comprising a composite.

* * * * *